US012345796B2

(12) United States Patent
Everett et al.

(10) Patent No.: US 12,345,796 B2
(45) Date of Patent: *Jul. 1, 2025

(54) COMPACT, HIGH-EFFICIENCY RADAR ASSEMBLY

(71) Applicant: Anduril Industries, Inc., Costa Mesa, CA (US)

(72) Inventors: Evan Jackson Everett, Fort Collins, CO (US); James Nathaniel Knight, Fort Collins, CO (US); Andrew Scott Mank, Fort Collins, CO (US); Erik George Moore, Fort Collins, CO (US)

(73) Assignee: Anduril Industries, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/970,889

(22) Filed: Oct. 21, 2022

(65) Prior Publication Data

US 2023/0375687 A1 Nov. 23, 2023

Related U.S. Application Data

(63) Continuation of application No. 17/751,593, filed on May 23, 2022, now Pat. No. 11,506,773.

(51) Int. Cl.
*G01S 13/26* (2006.01)
*G01S 13/48* (2006.01)
(Continued)

(52) U.S. Cl.
CPC .............. *G01S 13/26* (2013.01); *G01S 13/48* (2013.01); *H01Q 1/2258* (2013.01); *H01Q 3/36* (2013.01); *G01S 2013/0254* (2013.01)

(58) Field of Classification Search
None
See application file for complete search history.

(56) References Cited

U.S. PATENT DOCUMENTS 3,202,992 A * 8/1965 Kent ..................... H01Q 3/42
342/372
3,286,260 A * 11/1966 La ........................ H01Q 3/38
343/768
(Continued)

FOREIGN PATENT DOCUMENTS

EP 3543738 A1 9/2019
KR 2021-0060844 A 5/2021

OTHER PUBLICATIONS

P. Valentino and J. Stangel, "A phase/frequency scan subarray technique for wide signal bandwidth arrays," 1982 Antennas and Propagation Society International Symposium, Albuquerque, NM, USA, 1982, pp. 539-542, doi: 10.1109/APS.1982.1148800. (Year: 1982).*

(Continued)

*Primary Examiner* — Bernarr E Gregory
(74) *Attorney, Agent, or Firm* — Knobbe, Martens, Olson & Bear, LLP

(57) ABSTRACT

Provided is an array antenna divided into a plurality of sub-arrays disposed along a first dimension, wherein each sub-array comprises: a plurality of frequency scannable elements disposed along the first dimension and a plurality of phase shifters or transmit/receive (T/R) modules disposed along a second spatial dimension, each phase shifter or T/R module connected to a plurality of frequency scannable elements disposed along the first spatial dimension; and one or more processors being configured to generate a recurring radar waveform having a transmit portion, the transmit portion having multiple successive pulses at different frequencies to generate transmit beams by the array antenna at different angles in the first dimension; control at least one of the plurality of phase shifters or T/R modules along the second dimension to cause the transmit beams to be generated by the array antenna at different angles in the second (Continued)

dimension; and process return signals received by the plurality of sub-arrays to estimate a target location.

24 Claims, 15 Drawing Sheets

(51) Int. Cl.
*H01Q 1/22* (2006.01)
*H01Q 3/36* (2006.01)
*G01S 13/02* (2006.01)

(56) References Cited

U.S. PATENT DOCUMENTS

| | | | | |
|---|---|---|---|---|
| 3,438,035 A * | 4/1969 | Fling | ............... | H01Q 3/22 343/768 |
| 3,517,389 A * | 6/1970 | Dausin | ............... | G01S 13/426 342/371 |
| 3,646,559 A * | 2/1972 | Wiley | ............... | H01Q 3/32 343/858 |
| 4,034,374 A * | 7/1977 | Kruger | ............... | G01S 13/426 342/155 |
| 4,276,551 A * | 6/1981 | Williams | ............... | H01Q 3/26 342/372 |
| 5,013,979 A * | 5/1991 | Birleson | ............... | H01Q 3/22 342/372 |
| 5,239,301 A * | 8/1993 | Martin | ............... | H01Q 3/22 342/368 |
| 6,061,035 A * | 5/2000 | Kinasewitz | ............... | H01Q 3/22 343/770 |
| 6,124,828 A * | 9/2000 | Champeau | ............... | H01Q 3/2617 342/368 |
| 11,506,773 B1 | 11/2022 | Everett et al. | | |
| 2006/0152403 A1* | 7/2006 | Wicks | ............... | G01S 13/9054 342/25 R |
| 2006/0176217 A1* | 8/2006 | Lewis | ............... | H01Q 21/0087 342/372 |
| 2009/0015474 A1* | 1/2009 | Wicks | ............... | H01Q 3/22 342/372 |
| 2017/0207545 A1* | 7/2017 | Miraftab | ............... | H01Q 3/36 |
| 2018/0145421 A1 | 5/2018 | Yoon et al. | | |
| 2019/0064338 A1 | 2/2019 | Holt et al. | | |
| 2019/0324134 A1 | 10/2019 | Cattle | | |

OTHER PUBLICATIONS

International Search Report and Written Opinion for related International Patent Application PCT/US2023/023282 issued Sep. 15, 2023, 10 pages.

* cited by examiner

COMPACT, HIGH-EFFICIENCY RADAR ASSEMBLY

CROSS-REFERENCE TO RELATED APPLICATIONS

This patent application is a continuation of U.S. patent application Ser. No. 17/751,593, filed 23 May 2022, titled "COMPACT, HIGH-EFFICIENCY RADAR ASSEMBLY," now U.S. Pat. No. 11,506,773. The entire content of each afore-mentioned patent filing is hereby incorporated by reference.

BACKGROUND

The term "radar" is an acronym for "radio detection and ranging." Radars use electromagnetic waves to detect objects, if present, within a given volume of space. Radars can be used to determine various characteristics regarding an object's state, such as a location, speed, direction, range, altitude, elevation, and the like. A radar operates by emitting an electromagnetic (or "EM") wave, such as a radio wave, directed at a volume in space and detecting portions of the radio wave that reflect off an object located within the volume. In some cases, a radar scans a region of space by focusing electromagnetic energy into an angular beam, which is then swept across the surveillance volume in search of targets. The direction from the radar to a target is typically described in terms of a pair of angles, such as azimuth and elevation.

SUMMARY

The following is a non-exhaustive listing of some aspects of the present techniques. These and other aspects are described in the following disclosure.

Some aspects relate to a radar assembly, which may include transmitter antenna sub-assemblies and receiver antenna sub-assemblies. Transmission of signals from the transmitter antenna sub-assemblies may be controlled by transmitter signal processing circuitry. A direction for one or more transmission signals, such as emitted from the transmitter antenna sub-assemblies or from antenna elements of the transmitter antenna sub-assemblies, may be controlled in a first spatial direction by a first means. The direction for the one or more transmission signals may be controlled in a second spatial direction by a second means, where the first spatial direction and the second spatial direction may be orthogonal. In some aspects, the first means or the second means may be a phase-shifted means of control, which may correspond to active beam-steering (e.g., using integrated circuitry, such as phase shifters or transmit/receive modules) or passive beam-steering (e.g., using frequency scanning). In some aspects the first means or the second means may be a directional means of control (e.g., mechanical beam-steering).

Signals received by the receiver antenna sub-assemblies may be processed by receiver signal processing circuitry. A preferentially sensitive (e.g., a "preferred") direction for one or more received signals, such as received by the receiver antenna sub-assemblies or from antenna elements of the receiver antenna sub-assemblies, may be controlled in a first spatial direction by a first means. The preferred direction for the one or more received signals may be controlled in a second spatial direction by a second means, where the first spatial direction and the second spatial direction may be orthogonal. The direction of the received signal may correspond to a direction from which the received signal is reflected from a target in the surveillance volume. In some aspects, the first means or the second means may be a phase-shifted means of control, which may correspond to active beam-steering (e.g., using integrated circuitry, such as phase shifters or transmit/receive modules) or passive beam-steering (e.g., using frequency scanning). In some aspects the first means or the second means may be a directional means of control (e.g., mechanical beam-steering).

Some aspects relate to a radar assembly, which may include a transmit antenna assembly. The transmit antenna assembly may include an active beam-steering circuit and a passive beam-steering circuit. The active beam-steering circuit may be configured to control, along a first spatial dimension, a direction of an electromagnetic beam that scans a volume of the external environment to determine whether objects are located within the volume. The passive beam-steering circuit may be configured to control, along a second spatial dimension, the direction of the electromagnetic beam that scans the volume. The passive beam-steering circuit may include a set of antenna elements and a set of frequency scanned array cards respectively associated with the first set of antenna elements. The antenna elements may be configured to transmit the electromagnetic beam. Each frequency scanned array card may be configured to cause an input signal to be phase-shifted by a respective amount such that, along the second spatial dimension, the electromagnetic beam transmitted via the set of antenna elements is output in a direction of the volume. The phase-shifted input signal may be used by a respective antenna element to output a respective component of the electromagnetic beam, and the electromagnetic beam may be formed based on a combination of the respective components.

Some aspects include the radar assembly further including a receive antenna assembly. The receive antenna assembly may include an active beam-steering circuit and a passive beam-steering circuit. The passive beam-steering circuit of the receive antenna assembly may include a set of antenna elements, which may be the same or different from the set of antenna elements of the transmit antenna assembly and may also include a set of frequency scanned array cards respectively associated with the set of antenna elements of the receive antenna assembly. The set of antenna elements of the receive antenna assembly may be configured to receive a reflected electromagnetic signal resulting from the electromagnetic signal output by the transmit antenna assembly reflecting off one or more candidate objects located within the surveillance volume. The set of frequency scanned array cards of the receive antenna assembly may each be configured to receive a reflected electromagnetic beam of a given frequency from a corresponding direction along the second spatial dimension via constructive interference. The active beam-steering circuit of the receive antenna assembly may be configured to control, along the first spatial dimension, a preferred direction that the set of antenna elements of the receive antenna assembly will receive energy to detect reflections from the transmitted electromagnetic beam.

Some aspects of the radar assembly further include the first active beam-steering circuit being thermally coupled to a first heatsink, such that heat from the first active beam-steering circuit is conducted to an external environment, and the second active beam-steering circuit being thermally coupled to the first heatsink, such that heat produced by the second active beam-steering circuit is thermally dissipated to the external environment via the first heatsink.

Some aspects include an antenna assembly, which may include an active beam-steering circuit and a passive beam-steering circuit, where the passive beam-steering circuit may include a set of antenna elements and a set of frequency scanned array cards. The active beam-steering circuit may be configured to control, along a first spatial dimension, a direction of an electromagnetic beam that scans a volume of an external environment to determine whether objects are located within the volume, wherein the active beam-steering circuit is thermally coupled to a heatsink such that heat from the active beam-steering circuit is conducted to the external environment. The passive beam-steering circuit may be configured to control, along a second spatial dimension, the direction of the electromagnetic beam. The set of antenna elements may be configured to transmit the electromagnetic beam and receive a reflected electromagnetic beam resulting from the electromagnetic beam reflecting off an object. The set of frequency scanned array cards may be respectively associated with the set of antenna elements, and each frequency scanned array card of the set of frequency scanned array cards may be configured to cause an input signal to be phase-shifted by a respective amount such that, along the second spatial dimension, the electromagnetic beam transmitted via the set of antenna elements is output in a direction of the volume. The phase-shifted input signal may be used by a respective antenna element of the set of antenna elements to output a respective component of the electromagnetic beam, and the electromagnetic beam may be formed based on a combination of the respective components.

Some aspects include a process for operating the above-mentioned radar assembly as well as a process for fabricating the above-mentioned radar assembly, transmit antenna assembly, or receive antenna assembly.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
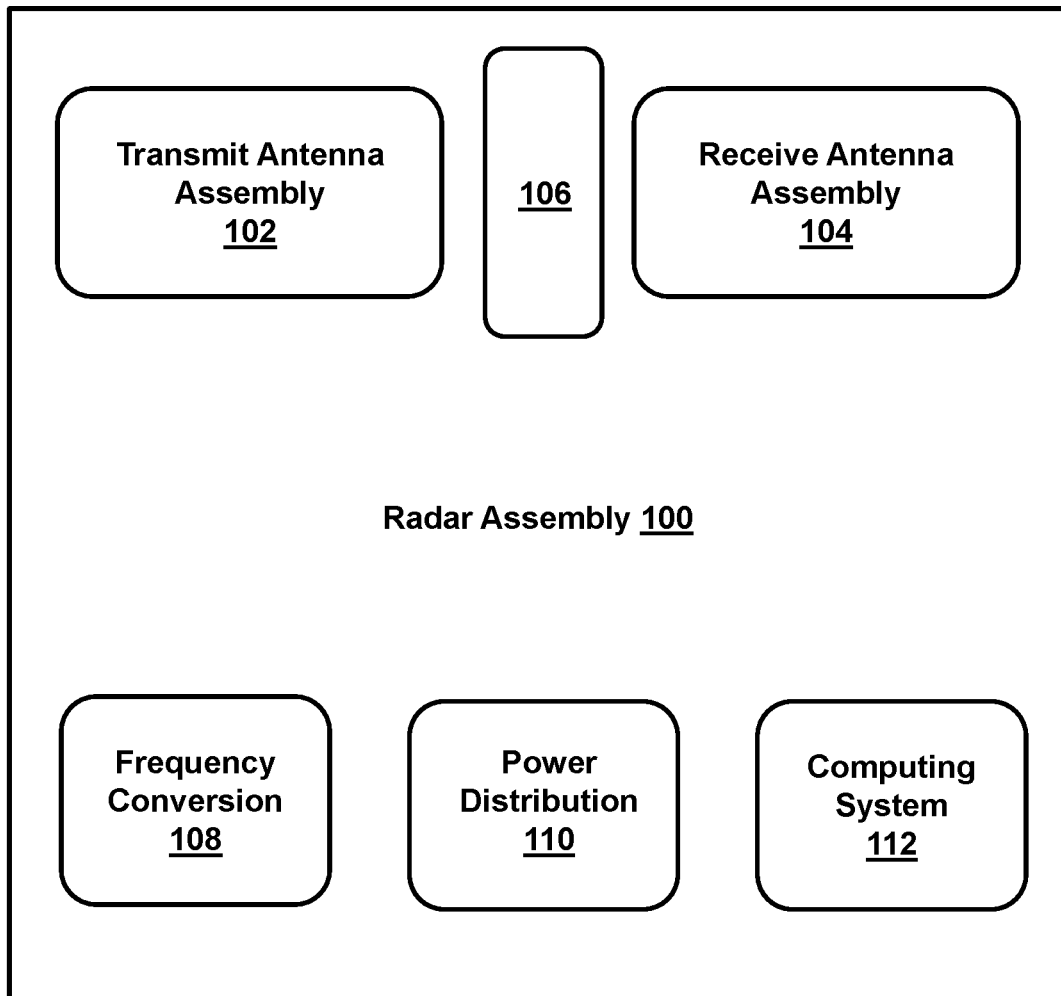
FIG. 1 is a system diagram that illustrates an example radar assembly, in accordance with one or more embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of radar. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

If the transmit beam of the transmit antenna assembly is smaller than the angular extent of the desired surveillance volume, the beam may be scanned/steered across the surveillance volume—either mechanically or electrically. An electrically scanned array (ESA) antenna may direct EM energy in a desired direction by transmitting a reference signal which may be phase shifted for some or each antenna element. The phase shifting may be designed so that the per-element signals interfere constructively in a desired direction and interfere destructively in other directions. The per-element phase shifts may be produced in many ways. In an active ESA, each antenna element may have its own transmit integrated circuit (IC), which may include both power amplification and phase shifting circuitry. In a passive ESA, a single transmitter may be connected to substantially all elements and each element may have its own phase shifter (which may be a phase shifting IC). In a metamaterial ESA, the EM properties of the transmission line and/or radiating elements may be altered to impart a desired phase shift in the per-element transmitted signals. In a frequency-scanned ESA, the frequency of the transmit signal may also or instead be altered, where such alteration may impart a desired per-element phase shift in conjunction with an appropriately designed serpentine transmission line connecting the radiating elements to the transmitter. These approaches may provide various transmitter performance or cost benefits. To optimize performance while minimizing cost, it may be beneficial for a method to be used to scan the transmitter beam in the azimuth direction and for a different method to be used to scan the beam in the elevation direction.

The set of antenna elements of the receive antenna assembly may be configured to receive a reflected electromagnetic signal resulting from the electromagnetic signal output by the transmit antenna assembly reflecting off one or more candidate objects located within the surveillance volume. If the extent of the receive antenna assembly's angular sensitivity is smaller than the desired surveillance volume, the direction of the receiver's "beam" (e.g., main lobe or peak sensitivity) may be scanned, steered, or otherwise directed across one or more directions, either mechanically or electrically. Methods enumerated for electrically scanning transmit arrays may similarly be applied to receive arrays, such as active scanning (e.g., using a low-noise amplifier per antenna element), passive scanning, meta-material scanning, and frequency scanning. Here again, techniques for receive ESAs may provide various receiver performance or cost benefits, and hybrid approaches that use different methods in the azimuth and elevation directions may be beneficial.

In addition to the scanning method selected for the transmit and receive antenna arrays, there are other radar design decisions that may have impacts on the performance and cost. For example, a radar may have a single antenna array that is used for both transmit and receive operations, or it may have separate transmit and receive arrays. Use of a single antenna array may reduce the amount of IC circuitry needed to implement the radar, but it may also correspond to a more complicated printed circuit board layout, a higher heat density for the array during operation, or a forfeiture of the ability to simultaneously transmit and receive. In another example, a radar may be actively cooled (e.g., using fans or other coolants driven by pumps) or passively cooled (e.g., via convection, dissipation, etc. through fluid or gas heat transfer). The use of active cooling may permit higher heat density (e.g., corresponding to higher power operation or denser IC layout) in the array or accompanying circuitry than may be acceptable in uncooled or passively cooled radars. However, active cooling may correspond to lower reliability because the radar may fail if the active cooling source fails. In yet another example, modern radars may be implemented using concepts from software-defined radios, wherein components that were originally implemented in analog circuitry are now implemented in software on a digital computer or embedded processor, such as a centralized processor unit (CPU), graphical processor unit (GPU), application-specific integrated circuit (ASIC), or field-programmable gate array (FPGA). The use of digital processing within a radar may require the presence of both analog-to-digital (A/D) converters and digital-to-analog (D/A) converters, to convert signals between analog and digital domains and vice versa. Herein "A/D converters" is used in a non-limiting sense to refer to A/D converters and to D/A converters or any other converters between digital and analog domains in any direction. Inclusion of A/D converters (or inclusion of additional A/D converters) may increase the opportunity to use advanced signal processing (such as digital beamforming) to improve radar performance, but it may also increase cost and heat generation due to the inclusion of additional digital processors.

A novel radar architecture may maximize target detection and tracking performance while maintaining reasonable cost by jointly optimizing the selection of transmit/receive scanning, radar cooling, and digital processing architecture. Radar detection performance is largely driven by a radar's effective radiated power and its receiver sensitivity. However, higher radiated power requires higher cooling capacity. Radar tracking performance is driven by range accuracy and angular accuracy, where the former is largely driven by signal-to-noise ratio (SNR) and signal bandwidth, while the latter is largely driven by SNR and the size of the antenna array in wavelengths (spatial bandwidth). For physically compact radars, it may be desirable to use higher frequency radar signals to increase the electrical size (e.g., in wavelengths) of the antenna array (which may be accomplished without increasing its physical size), thereby improving angular accuracy. However, as frequency increases, the spatial constraints of planar phased array architectures become a significant challenge, as does the increased heat density. Generally, as transmission frequency increases, spacing between elements of the phased array decreases, but thermal dissipation required by the electronics does not generally significantly decrease with frequency.

Angular accuracy may also be improved by implementing a sub-array architecture where the antenna array is sub-divided into mutually exclusive collections of antenna elements, where each sub-array has its own A/D converter, so multiple return signals can be measured simultaneously. For example, an antenna array may be sub-divided into quadrants: left-up, left-down, right-up, and right-down. The antenna array may also be sub-divided into greater than four sub-units, including unequal numbers of sub-units along a first direction and a second direct—for example 8 units, 16 units, 36 units, etc. Angular accuracy in azimuth that is significantly less than the azimuth angular extent of the antenna beam (e.g., accuracy smaller than antenna beam dimension) may then be achieved by applying interferometric (e.g., monopulse) techniques to the two or more signals, such as, for example, a signal generated by summing the left-up and left-down receiver channels and a signal generated by summing the right-up and right-down receiver channels. In a similar fashion, angular accuracy in elevation that is much less than the elevation angular extent of the antenna beam may also be achieved by applying interferometric (e.g., monopulse) techniques to the two or more signals, such as, for example, a signal generated by summing the left-up and right-up receiver channels and a signal generated by summing the right-down and left-down receiver channels. Alternatively, maximum likelihood estimation techniques may be applied to all receiver channels (e.g., four receiver channels: left-up, left-down, right-up, and right-down for an antenna array divided into quadrants) jointly to achieve angular accuracy in both azimuth and elevation that is less than the angular extent of the antenna beam in these dimensions. However, this improved angular accuracy may increase the cost and heat generation of the radar by requiring additional A/D converters (e.g., one per sub-array).

Radar costs are largely driven by the cost of the transmit/receive integrated circuitry and the costs of integration hardware (cables, connectors, etc.). Certain radar architectures, like planar architectures, lend themselves to reduced complexity and thus reduced cost by addressing the integration cost component. Phased arrays can also reduce cost by reducing the number of moving mechanical components. It should be emphasized that embodiments are not limited to systems that avoid all of these issues and discussion of such issues should not be read as a disclaimer or disavowal of claim scope.

Some embodiments mitigate the spatial challenges that arise as frequency increases, the thermal challenges that arise with increased element density, or the cost challenges that arise as the number of phased array elements increases.

The antenna architecture may include a heatsink, an active electronic scanning board, passive scanning boards and antenna elements, and a radome. The radar architecture may include a transmit antenna, a receive antenna, a radio frequency (RF) isolator separating the two antennas, and associated radar processing hardware.

Some embodiments are expected to mitigate some or all of the above-mentioned problems by separating the transmit and receive antennas, which reduces the complexity of the electronics, and allows simultaneous transmit and receive, which reduces the required peak power needed to be radiated for a given radar detection requirement. Some embodiments mitigate the problem of transmit-receive interference through the use of an RF (radio frequency) isolator to reduce the RF signal energy transferred from the transmit antenna to the receive antenna. Some embodiments are also expected to mitigate some or all of the above-mentioned problems by separating the electronic scanning into an active scanning component and a passive scanning component (which may be referred to as a hybrid scanning architecture) which is expected to: 1) allow the heat-generating electronics for the active scanning component to be implemented in a planar architecture on a single printed circuit board (PCB) mated directly to a heat sink for efficient and passive thermal handling; 2) allow antenna elements that are passively scanned to be arranged on planar PCBs that have no powered integrated circuitry, and therefore are inexpensive to manufacture and do not require connection to a heat sink; 3) allow the electronics to achieve the phased array antenna element spacing corresponding to the Ku-band by significantly reducing integrated circuitry from one of the two dimensions of beam scanning (e.g., such that the integrated circuitry needed for the antenna arrays scales according to the number of columns (or another dimension) in the arrays, rather than the total number of antenna elements (or components in both a first and a second dimension)); or 4) significantly reduce the overall number of active electronic components, thereby reducing cost and heat generation.

For certain use cases, it is desirable for radar systems to be able to detect objects in the Ku frequency band (12-18 GHz). As the frequencies increase, the size of the components used to form the radar, such as the antenna elements used to output EM waves and detect reflected EM waves, decreases. As the radar components decrease in size, the costs to fabricate the radar systems increase. In addition, these radar systems can produce substantial amount of thermal output which manifests as heat density, particularly at such high frequencies. Active cooling techniques, such as liquid nitrogen, are not feasible when the radar is used in the field, as it is costly and difficult (and dangerous) to transport. These and other drawbacks exist, though it should be emphasized that embodiments are not limited to systems that avoid all of these drawbacks and discussion of such issues should not be read as a disclaimer or disavowal of claim scope.

As the use of radars continues to increase, the needs of radar systems and radar system users also expand, shift, and adapt. One use of radar that has important security and safety implications is the use of radar for short-range air surveillance applications. Some examples of short-range air surveillance applications include, but are not limited to—which is not to imply that other lists are limiting—air defense applications, beyond line-of-sight unmanned aircraft operations or defense, ground-based sense and avoid, or other air-space management applications, or combinations therefore. In some cases, air-space management applications may include applications at smaller airports where a larger radar is not available or not affordable.

Some of the challenges faced by manufacturers when developing radars for short-range air surveillance applications include providing electronic beam-steering in two dimensions at Ku-band (12-18 GHz) frequencies and near Ku-band (8-22 GHz) frequencies. It should be noted that other portions of the electromagnetic spectrum, occupying different frequency ranges may also be used instead of, or in addition to, the frequencies of the Ku-band, which is not to suggest that other described features are limiting. In some use cases, the challenges faced by manufacturers to build radars that provide electronic beam-steering in two-dimensions at Ku-band frequencies may be similar or share similarities with the challenges experienced developing such a radar operating at other frequency bands. For example, electronic beam-steering may be needed between 10-20 GHz, 1-20 GHz, or other frequency ranges. The frequency range may be adjusted based on a geographic location of the radar. For example, North American locations may include regions represented by the 11.7-12.2 GHz range for fixed satellite service.

As the frequency band that the radar operates at increases, the size and spacing of the components used to fabricate the radar generally decrease, following the inverse relationship of wavelength and frequency. For example, the spacing between antenna elements in a phased array antenna, examples of which are described below, may be one half of the transmitted or received wavelength, including spacing of half of the transmitted or received wavelength plus or minus 5% or 20%, (as measured from edge to adjacent edge) in order to mitigate loss of performance through grating lobes, e.g., about one cm apart for Ku-band use cases. For example, antenna elements used to form portions of an antenna assembly for a radar are designed based on the wavelength of the signal being transmitted/received. In the Ku-band, where the frequencies of the electromagnetic signals are between 12-18 GHz, the wavelength will be between 1.67-2.5 cm. As another example, for infrared signals, having a frequency between 300 GHz and 430 THz, the wavelength is between 700 nm and 1 mm. Along with the size decreases of the components, the tolerances with which those components are made (or operated) may also decrease, meaning higher levels of precision are needed during fabrication, and thermal budgets can become tighter as more heat-generating components need to be packed into a smaller volume. Generally, the more precise and compact a structure is, the greater the time and cost it takes to produce.

In some embodiments, an antenna assembly includes an antenna and various other components, e.g., beam-steering circuits. An antenna (like a phased array antenna) may be formed of one or more antenna elements. In some embodiments, an antenna element is a portion (like a conductive member) of a phased array antenna involved in the reception or transmission of a signal, e.g., the electromagnetic radiation output as a beam towards a volume in space. The size and shape of the antenna elements may be determined based on the frequency band (or bands) with which the radar is to operate. The shape and size will be related to the wavelength of the electromagnetic radiation to be output and received. Antenna elements may be distinct conductors electrically connected (e.g., independently of one another, or with some different set of circuit elements) to transmitters or receivers.

Another challenge addressed in some embodiments is cooling. To steer the electromagnetic beam, whether during transmission or reception, "active" components are used. An active component may dynamically switch which antenna elements receive energy to steer an electromagnetic beam. Some embodiments include components actuating or otherwise causing a component to be physically moved. For example, the transmit/receive antenna elements, cables, connectors, motors, etc. Active and passive components may generate heat when conducting electrical signals. Electrical components generally produce heat, and as radar components carry electrical signals heat is generated by conduction, switching, power transfer, and other electrical operations. As the internal temperature of the radar increases, the performance of the radar can become impaired in some use cases. This technical problem can be exacerbated when the external environment, such as the environment wherein which the radar is deployed and used, is itself hot. For example, desert environments, where the temperature can exceed 30 degrees Celsius, can increase a base temperature of the radar such that the additional heat produced by the active components of the radar cause the radar to overheat and subsequently malfunction.

One approach to thermal management is to include some form of "active cooling" with the radar. Active cooling components generally consume energy in service of removing waste heat, but such approaches can be undesirable in some cases (which is not to suggest that they, or any other approach for which tradeoffs are discussed, are disclaimed). For example, active cooling via evaporative cooling with liquid nitrogen or liquid helium is often infeasible in certain use cases, such longer-term use, operation in remote desert environments, operation in non-terrestrial environments, etc. Refrigeration systems similarly can impose cost, size, noise (e.g., vibration), and complexity tradeoffs and can have compressors or fans break. (Peltier elements, e.g., disposed between a heat sink and a heat-generating component with the hot-side adjacent the heat sink, consume energy in service of removing waste heat, but avoid other forms of active movement and are treated as a form of passive cooling herein.)

Mechanical complexity, generally, is desirable to avoid for some use cases. Some antenna architectures lend themselves to reduced complexity, which is expected to reduce the cost of fabricating the radar. An example antenna architecture that can be used to reduce complexity is a planar architecture. In some embodiments, a planar architecture includes antenna elements arranged in an array on a surface, e.g., as a one- or two-dimensional array on a planar surface which is not to disclaim a three-dimensional or quasi-three dimensional array in which the surface is not planar, is not perfectly planar (for example, has features or features which overlap in a third dimension which are much smaller than features in the directions of the planar surface), is curved, etc. For instance, a planar array may include antenna elements arranged (such as in a rectangular or hexagonal grid) in a N×M grid, where N and M may be equal in some embodiments. In other examples, the array may be on a surface that is not co-planar, e.g., with the array conformally disposed on a sphere or section of a sphere. In some embodiments, N and M are integers, and can have a value of 2 or more, 4 or more, 8 or more, 16 or more, 32 or more, 64 or more, 128 or more, or other values.

As frequency increases, the spatial constraints of the planar array drive thermal constraints that become challenging, particularly due to the increased heat density, as mentioned above. In particular, at higher frequency ranges, such as for radars that are to operate in the near Ku-band, the spacing between elements of the antenna array may be relatively small, like on the order of 0.5 to 2 cm between antenna elements, which causes the density of heat generating electronics to be relatively large.

An antenna having a phased array architecture, which is referred to herein interchangeably as a "phased array antenna," may include an array of antenna elements that are used for transmitting or receiving electromagnetic signals, which together form a directional radiation pattern for transmission and a directionally favored gain for reception. Examples include both phase scanning and frequency scanning antenna. Patterns in constructive and destructive interference from signals sent or received by each of the antenna elements and combined may impart that directionality. A directional radiation may cause an overall beam of electromagnetic radiation steered in a particular direction. Phased array antennas have certain benefits over other types of antenna assemblies. For instance, a phased array antenna may allow for rapid beam-steering, multiple phase centers, low sidelobes, etc.

The electromagnetic radiation output by the antenna may be described in physical space using a vector. The magnitude of the vector can be controlled by adjusting the gain of the electromagnetic radiation. The location in space where the electromagnetic radiation is directed can be described using an azimuthal angle and an angle of elevation.

A transmit antenna assembly may include a plurality of antenna elements. Each antenna element may output a portion of a resulting electromagnetic beam. The total electromagnetic beam is formed by combining the portion output by each antenna element through constructive and destructive interference. In some embodiments, beam direction is modulated without the radar assembly moving by applying a phase shift to some or all of the antenna elements' signals so as to adjust the direction of the resulting electromagnetic beam. In some embodiments, the radar may also move. In some embodiments, one or more phase shifters may be included in the transmit antenna assembly (or the radar assembly including the transmit antenna assembly). For example, each antenna element may have a corresponding phase shifter that applies a respective phase shift to the input signal fed to or from the antenna element. However, fewer phase shifters may be included, such as less than one phase shifter per antenna element. In some embodiments, the transmit antenna assembly may include a source element (like a transmitter) used to generate a source signal. The source element may provide the source signal to each phase shifter to apply the phase shift to a respective component of the source signal. After the source signal is provided, each element signal (the component of the source signal provided to each phase shifter) may be phase shifted by the designated amount of phase-shifting using the respective phase shifter. The phase-shifted element signal may be provided to the corresponding antenna element (or an amplifier to amplify the signal, then to the antenna element) to be output. In some cases, phase shifts may monotonically increase in a first direction along a spatial dimension of an array of antenna elements when scanning to one side and monotonically decrease in the opposite direction along the spatial dimension of the array of antenna elements when scanning to the opposite side. The amount of increase or decrease in phase shift between antenna elements may be modulated, for example to adjust the directionality.

A receive antenna assembly may include similar components as that of the transmit antenna assembly. A receive antenna assembly may further include low-noise amplifiers coupled to the antenna elements and a power combiner may be used to combine the received signals (which may be combined after being phase shifted back by the same or different phase shifters coupled to the antenna elements). The combined received signal may be provided to a receiver element, which may convert the combined receive signal into the digital domain and provide the resulting data to another component to analyze whether any objects are present within a volume defined by the directionality of the output electromagnetic beam.

In some embodiments, a single antenna assembly may be used for both transmit and receive operations, e.g., at different times, alternating between roles. In some such cases, the antenna assembly may include one or more transmit/receive (T/R) modules. The T/R module may allow the antenna assembly to simultaneously, e.g., within 1 second of each other, within 1 millisecond of each, within 1 nanosecond of each other, and the like, transmit electromagnetic radiation towards a volume in space and receive a portion of the electromagnetic radiation that reflects off objects located within the volume.

In some embodiments, the interface pattern produced by a two-dimensional planar phased array can be represented by Equation 1:

$$AF(\theta, \varnothing) = \sum_{m=1}^{M/2} \sum_{n=1}^{N/2} w_{mn} \cos[(2m-1)u] \cos[(2n-1)v], \text{ where } u = \pi d_x/\lambda(\sin\theta \cos\phi - \sin\theta_0 \cos\phi_0), \text{ and } v = \pi d_y/\lambda(\sin\theta \sin\phi - \sin\theta_0 \sin\phi_0) \quad \text{Equation 1.}$$

In Equation 1, $w_{mn}$ represents the amplitude of the weight of a given antenna element at its particular position in the array, $d_x$ and $d_y$ represent the spacing between the antenna elements, $\theta$ represents the angle of elevation that the electromagnetic radiation is to be steered, $\phi$ represents the azimuth angle, and $\lambda$ represents the wavelength of the output signal. The two-dimensional planar array may function by creating electromagnetic waves directed in a particular direction, where superposition of the electromagnetic waves produced by each antenna element generate the output electromagnetic beam directed towards a target location in space.

In some embodiments, antennas implementing a phased shifted planar array may be used to detect whether a given volume in space includes any objects, or the radar can be configured to scan across a range of volumes to determine whether any objects are present within a generalized field of view of the radar. Some embodiments adjust one or more active phase shifters to apply different phase shifts to the respective source signal; some embodiments adjust the frequency of the source signal; or some embodiments do both. A phased array antenna that accomplishes beam-steering by adjusting the frequency of source signal provided to the antenna elements is referred to as a frequency scanning array. As an example, an antenna assembly may include antenna elements, directional couplers connected respectively to antenna elements, and matched filters respectively connected to directional couplers. Each antenna element may be spaced apart by a distance d, which is the distance between the centers of adjacent elements (although other points of reference may be used to measure spacing), and which may be selected based on the frequency band the antenna assembly is designed to operate, e.g., at approximately one half the wavelength of the electromagnetic signals. In some embodiments, the directional couplers may be configured to control the signal to be transmitted or received by the respective antenna elements. The matched filters may facilitate balancing the loads between the connections of the directional couplers and the matched filters to minimize (or at least reduce) an amount of reflection of the signal within the transmission lines. The matched filters may be coupled to a transmitter/receiver to process the signals.

In some cases, a linear array (as opposed to a two-dimensional array) may be used to cause an output electromagnetic beam to be adjusted to scan across a field of view. For example, an angle of the vector describing the electromagnetic beam can range between values $\varnothing=0$ and $\varnothing=\pi$ (180 degrees) where these are non-limiting values. For example, the angle of the vector can be described as varying between $\varnothing=-\pi/2$ and $\pi=\pi/2$. The frequency scanning technique may allow the electromagnetic beam to scan across some or all values of $\varnothing$ by adjusting the frequency of the source signal provided to the antenna elements. Frequency scanning is a desirable technique for performing beam-steering because no moving parts (e.g., parts causing physical movement, motors, etc.) are needed, reducing the chances of malfunction, as well as not requiring any cooling (active or passive). Another advantage of the frequency scanning technique is that it does not require phase shifters. Removal of phase shifters from the antenna assembly can reduce the cost of fabrication, as well as decrease the complexity of the build.

In some embodiments, the radar assembly may include frequency scanning array components that operate to cause each antenna element to output a portion of the electromagnetic beam, with frequency changing over an amount of time so as to execute a scan of physical space. For example, in one dimension, the frequency scanning array components may function to move the electromagnetic beam from $[-\theta, +\theta]$ or $[-\phi, +\phi]$ where $\theta$ represents the angle of elevation and can range between 0 and 90-degrees, and $\phi$ represents the azimuth angle and can range between 0 and 180-degrees, though the example ranges are not to be construed as limiting. In some embodiments, the antenna elements may be fed serially with a source signal that has a same frequency, such that each antenna element receives a component of the source signal that may have a different phase (e.g., when received at the antenna element) at a given time. For example, the frequency scanning array components may include a long trace that is arranged in a manner so as to provide a particular amount of delay, for example where the amount of delay is due to the length of the trace, which affects the phase of the signal. A long trace or traces of different lengths can affect the phase or phase coherence of multiple signals by generating a phase offset as a function of the speed of transmission of the signal along the trace (e.g., the signal is delayed by a time equal to the distance of the trace divided by the speed of transmission along the trace). If the length and arrangement of the traces on each frequency scanning array component is substantially the same, each antenna element may then output a portion of the resulting electromagnetic beam that is substantially in phase with the other portions. However, if the frequency is changed (which changes the number of wavelengths which correspond to the length of the trace), the specifically designed trace may no longer cause the portions of the electromagnetic beam output by each antenna element to be substantially in phase, and a phase shift between the portions of the electromagnetic beam may occur. For example, two traces which are of length X and Y may be in phase for a first frequency F1 with a wavelength $\lambda 1$, where $X=n*\lambda 1$ and $Y=m*\lambda 1$ where n and m are integers. In the same example, the two traces may not be in phase for second frequency F2 with a wavelength $\lambda 2$, where $X=p*\lambda 2$ and $Y=q*\lambda 2$, where at least one of p and q is not an integer. In some cases, the frequency of the source signal may be adjusted, while the arrangement and length of the trace of each frequency scanned array element may also be adjusted. The resulting beam may therefore be directed in a particular direction based on the superposition of the portions of the electromagnetic beam.

Some embodiments include radars, and antenna assemblies for radars, which are configured to provide beam-steering in two dimensions, such as azimuth and elevation, and operate in the Ku frequency band, e.g., 12-18 GHz. Some embodiments include using passive beam-steering techniques, such with frequency scanned array cards, to scan regions of space in one (or more) spatial dimensions, such as elevation. For example, the frequency associated with the frequency scanned array cards may be used to determine an elevation of an output electromagnetic beam, an elevation of an object detected by the output of the electromagnetic beam (such as based on correspondence of frequency, etc.). In some cases, the frequency scanned array cards may be used additionally, or alternatively, to scan regions of space in an azimuthal dimension. Some embodiments include a radar assembly that is expected to mitigate (or in some cases overcome) the aforementioned problems while also reducing production costs and increasing scalability. Some embodiments include a radar assembly and an antenna assembly thereof that are passively cooled. Passive cooling is expected to further reduce costs or size by eliminating or reducing the need for active cooling. Some embodiments perform concurrent transmit/receive operations.

Figure 2:
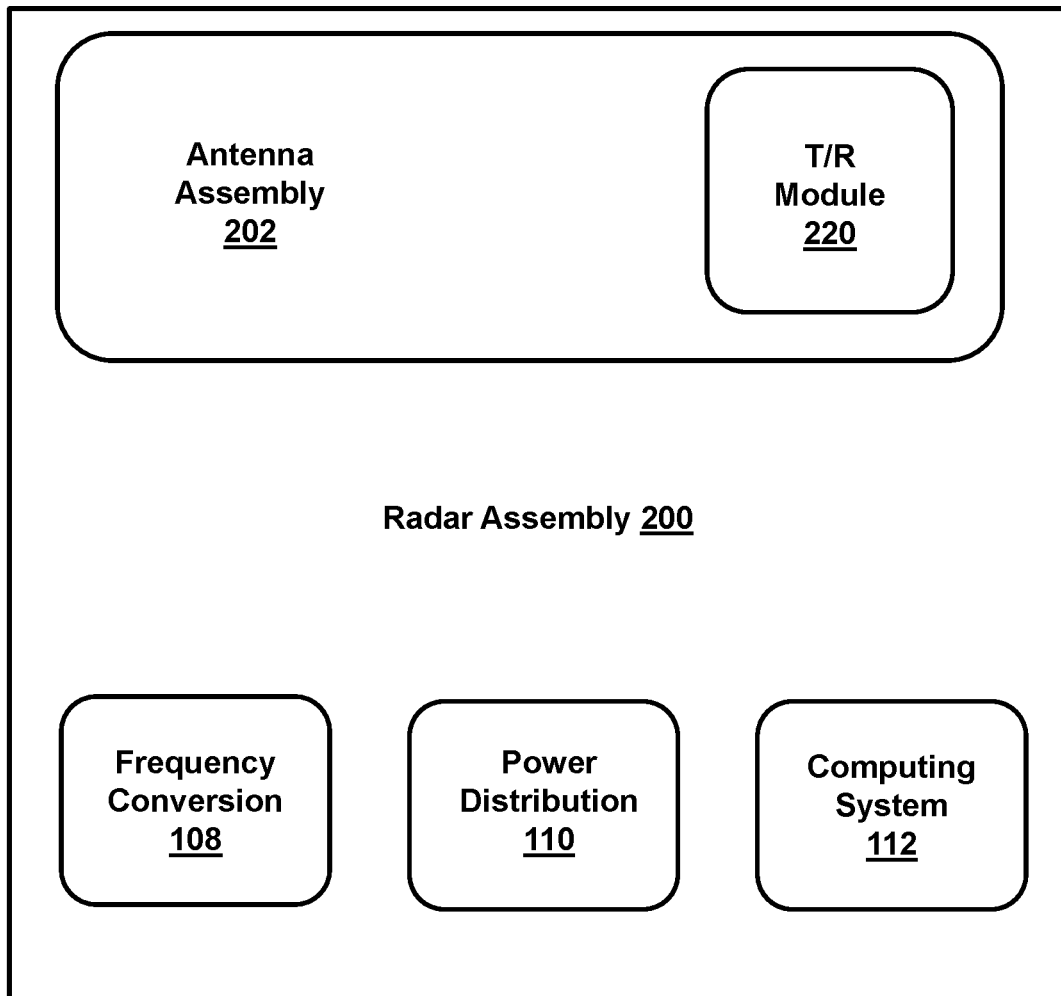
FIG. 2 is a system diagram that illustrates another example radar assembly, in accordance with one or more embodiments.

In some embodiments, a radar assembly may include a transmit antenna assembly and a receive antenna assembly. FIG. 1 depicts an example radar assembly 100, which may include transmit antenna assembly 102, receive antenna assembly 104, isolation component 106, a frequency conversion component 108, a power distribution component 110, a computing system 112, or other components. FIG. 2 shows radar assembly 200, which may be substantially similar to radar assembly 100 of FIG. 1, with the exception that radar assembly 200 includes a single antenna assembly 202, and a transmit/receive (T/R) module 220. While only one T/R module 220 is depicted for reasons of simplicity, multiple T/R modules which may allow transmit and receive mode operation on a single antenna assembly 202 (or on one or more antenna element) may be present. T/R module 220 may comprise T/R module or unit for antenna assembly 202, multiple T/R modules for antenna assembly 202, one transmit/receive (T/R) module per antenna element of antenna assembly 202, etc. Antenna assembly 202 may be configured, such as by using T/R module 220, to perform both transmit and receive operations. In some embodiments, the transmit and receive operations may be performed in parallel, e.g., within 1 second of one another, within 1 millisecond of one another, within 1 nanosecond of one another, etc.

In some embodiments, radar assembly 100 (or 200) may be portable (e.g., movable from location to location), including mobile (e.g., operable during transport). In some embodiments, radar assembly 100 (or 200) may be 16" by 22" by 6.5" in size. These dimensions should not be taken as limiting, and in some embodiments radar assembly 100 (or 200) may be larger or smaller, such as half the size of the above dimensions or on the order of 8" by 11" by 3".

In some embodiments, transmit antenna assembly 102 may be configured to perform transmit operations where an electromagnetic beam is output from one or more antenna elements of transmit antenna assembly 102. The electromagnetic beam may be steered by transmit antenna assembly 102 such that it scans a particular region of space. Transmit antenna assembly 102 may be configured to determine whether objects are located within the scanned space and, if present, in some embodiments, responsive to control signals, track the objects' movements. To detect objects, in some embodiments, transmit antenna assembly 102 outputs, using the antenna elements, electromagnetic radiation beams of a particular width and shape such that the electromagnetic radiation travels from the antenna elements out towards a given volume of space. The given volume may be defined using a coordinate system. For example, the volume's location may be specified in cartesian coordinates (x, y, z) relative to the location of the antenna elements. As another example, the location may be specified based on a gain needed for the electromagnetic radiation to reach (with high probability) the location, a first angle defining an azimuth, and a second angle defining an elevation. More generally, the location analyzed by the electromagnetic beam defines a volume V, and that volume V can be moved about space to carve out a region to be (or that has been) analyzed. If an object is located within the volume V, then the electromagnetic beam may reflect off the object and be directed back toward the radar assembly. By analyzing the reflected electromagnetic beam over time and space, motion of the object, as well as other characteristics, e.g., location, size, shape, number of objects, etc., can be determined, in some embodiments. In some embodiments, by analyzing the relationship between multiple reflected beams, such as by interferometry, motion or location of the object, as well as other characteristics, e.g., size, shape, number of objects, etc., can be determined. The multiple reflected beams can correspond to multiple reflections of the same transmitted beam, reflections of multiple transmitted beams, or a combination thereof. The multiple reflected beams may also be detected at one or more elements of a receiver antenna. Interferometry may be used to measure the constructive or destructive interference of a received signal and to gain information about the path length of relative signals, and may therefore be used to gain additional information about an object corresponding to multiple reflected signals, such as location, speed (for instance in red-shift or blue-shift), etc. Interferometry may be used in addition to or instead of some electronic signal processing methods to derive such characteristics of detected objects.

Figure 3A:
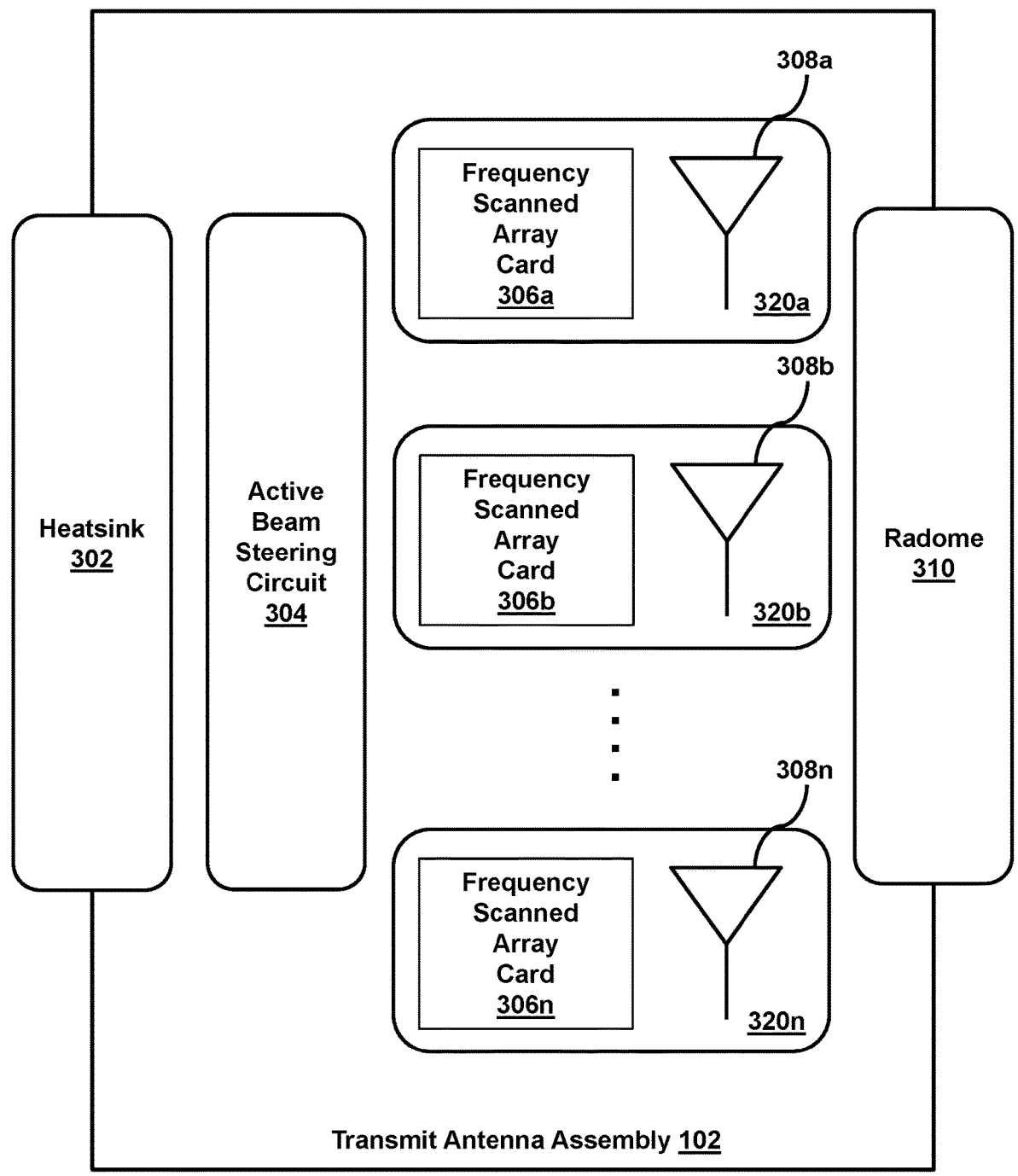
FIG. 3A illustrates an example transmit antenna assembly, in accordance with one or more embodiments.

As an example, FIG. 3A depicts transmit antenna assembly 102, which may include a heatsink 302, an active beam-steering circuit 304, a set of passive beam-steering circuits 320a-320n (which may be referred to collectively as passive beam-steering circuits 320 and individually as passive beam-steering circuit 320), a radome 310, or other components. Each passive beam-steering circuit 320 may include a frequency scanned array card 306 and an array of antenna elements 308, which may be an array containing one element (e.g., a zero-dimensional array or point array), a linear array (e.g., a one-dimensional array), a two-dimensional array, etc. For example, passive beam-steering circuit 320a may include frequency scanned array card 306a and an array of antenna elements 308a (for simplicity one representative antenna element 308a is depicted in FIG. 3A which is not to disclaim that multiple antenna elements 308a may be present), passive beam-steering circuit 320b may include frequency scanned array card 306b and an array of antenna elements 308b, and passive beam-steering circuit 320n may include frequency scanned array card 306n and an array of antenna elements 308n. In the foregoing, for simplicity, and unless otherwise specified, the labels of "a"-"n" will be omitted when referring generally to the class of components at issue, e.g., array of antenna elements 308. The number "n"

of passive beam-steering circuits 320 that are included within the set of passive beam-steering circuits of transmit antenna assembly 102 may vary depending on the performance criteria of the radar assembly. For example, "n" may be 1 or more, 5 or more, 10 or more, 50 or more, 100 or more, or other values. The greater the number "n" is, the greater the quantity of frequency scanned array cards 306 and antenna elements 308 that may be included to produce transmit antenna assembly 102. Furthermore, and as noted in more detail below, the number of passive beam-steering circuits, and components thereof, included within transmit antenna assembly 102 may be the same or different from the number of similar components included within receive antenna assembly 104.

As described herein, a frequency scanned array card may be referred to interchangeably as a frequency scanned array component. Furthermore, the word "card" is not to be construed as requiring the frequency scanned array card to have any particular form factor, e.g., to be of a same or similar size, shape, dimensionality, or style as a playing card, notecard, credit card, or another type of card. The frequency scanned array cards described herein refers to components configured to perform passive beam-steering for radars.

Heatsink 302 may be configured to facilitate the transfer of heat from transmit antenna assembly 102 to an environment external to transmit antenna assembly 102 and radar assembly 100 (as well as radar assembly 200). Heatsink 302 may be in thermal communication with the external environment and the radar assembly 100 or 200, such that the heat dissipates away from radar assembly 100 or 200 to the environment via conduction through the heat sink. Heatsink 302 may be thermally insulated from other components, such that heat does not inadvertently dissipate to another portion of the radar assembly, in some embodiments. Heatsink 302 may be formed of a material selected based on the thermal conductivity of the material, the environment that the radar is to be deployed and operate, the material composition of the transmit antenna assembly (and its components), or other criteria. As an example, heatsink 302 may be formed from aluminum or copper. In another example, heatsink 302 may include or be connected to a liquid component, such as a liquid heatsink reservoir, which may be an electrically conductive liquid (such as water) which may be further insulated from any electronic elements, which may be a thermally conductive, electrically non-conductive liquid (such as a silicon oil) in which the electronic components may be immersed, etc. In some embodiments, transmit antenna assembly 102, as well as, or alternatively, radar assembly 100, may include one or more thermal connectors to heatsink 302. For example, a thermal adhesive or paste, copper wires, copper screws and bolts, and the like, may be used to connect transmit antenna assembly 102 to the external environment. Some embodiments may further include Peltier elements and heat pipes thermally disposed between the radar assemblies 100 and 200 and the environment. Some embodiments may further take advantage of convection in addition to or instead of conduction, such as connection of heatsink 302 to an environmental convective element (such as exposure to a windy area or other atmospheric or hydrological convection current) or convective fluid heatsink. In some embodiments, heatsink 302 may be configured to facilitate dissipation of 1 or more Watts of power, 10 or more Watts of power, 100 or more Watts of power, or other amounts.

While heatsink 302 is depicted as being connected to transmit antenna assembly 102, some embodiments include heatsink 302 being a separate component of radar assembly 100, or a component external to radar assembly 100. For example, heatsink 302 may include thermal connections that connect heatsink 302 to transmit antenna assembly 102 while heatsink 302 is disposed external to transmit antenna assembly 102.

In some embodiments, active beam-steering circuit 304 may be configured to control a direction of electromagnetic radiation output by transmit antenna assembly 102. Active beam-steering circuit 304 may include one or more components that move or actuate another component of transmit antenna assembly 102 to adjust the directionality of the output electromagnetic radiation. For example, active beam-steering circuit 304 may include one or more motors that are coupled to antenna elements 308 and cause antenna elements 308, or a subset of antenna elements 308, to adjust their orientation so as to be directed at a particular location in space. In some embodiments, active beam-steering circuit 304 may be configured to cause a frequency of a component of a source signal to be adjusted such that a corresponding antenna element outputs a portion of an overall electromagnetic beam that has a desired phase-shift. Some cases include connections, e.g., wires, electrically connecting active beam-steering circuit 304 to some or all of antenna elements 308 or other antenna elements to cause the output electromagnetic radiation to transmitted therefrom.

In some embodiments, active beam-steering circuit 304 may be configured to switch between antenna elements to steer an electromagnetic beam being transmitted by transmit antenna assembly 102. For example, active beam-steering may include causing a different antenna element or subset of antenna elements to output electromagnetic radiation having a particular phase shift so that a resulting electromagnetic beam—formed by combining the electromagnetic radiation output by each antenna element—is directed towards a target location.

Active beam-steering circuit 304 may be configured to steer the electromagnetic radiation in various directions along a first dimension. For example, active beam-steering circuit 304 may cause the electromagnetic radiation to move across a first spatial dimension or a second spatial dimension. The first spatial dimension and the second spatial dimension may be orthogonal to one another. For example, the first spatial dimension may refer to the azimuthal dimension (e.g., along an x-y plane) and the second spatial dimension may refer to the elevation dimension (e.g., the y-z plane). Use of the terms "orthogonal" and "perpendicular" and the like does not require that the two spatial dimensions be perfectly perpendicular, as the two dimensions may be separated by an angle of approximately 90-degrees, e.g., 90-degrees±δ, where δ is a configurable variable having a value between 0-1-degrees, 0-5 degrees, or 0-10 degrees. In some cases, the two dimensions are non-orthogonal.

Active beam-steering circuit 304 may, in some embodiments, be in thermal communication with heatsink 302. As active beam-steering circuit 304 may be the primary (or only) component of transmit antenna assembly 102 that produces heat or significant heat, heatsink 302 may function to thermally control heat output of active beam-steering circuit 304. By having the heat producing components of transmit antenna assembly 102, and radar assembly 100, thermally connected to heatsink 302, the heat produced within transmit antenna assembly 102 may dissipate to the external environment without the need for incorporating a form of active cooling to the radar assembly. This may increase the mobility, versatility, and usability of the radar system be eliminating the need to store and apply active cooling means. Even in hot environments (such as above 35 degrees Celsius) use of heatsink 302 can extend the operability of active beam-steering circuit 304 or other circuitry, such as extend transmit time versus cool time in a transmit-cool cycle, increase temperature operability range, etc. In some embodiments, heatsink 302 may provide heat dissipation as long as a thermal gradient is maintained in which the heat is drawn away from the heat producing components of transmit antenna assembly 102, radar assembly 100, etc. In some embodiments, an active cooling system may be additionally used in extreme environments or under extreme conditions, such as episodically if environmental temperature exceeds a temperature limit (for example 40 degrees Celsius). In some embodiments, active beam-steering circuit 304 may be formed at least partially from a printed circuit board (PCB), and thus the active components of active beam-steering circuit 304 may be restricted to only being disposed on the PCB. Therefore, by thermally connecting active beam-steering circuit 304 to heatsink 302, the PCB may be thermally connected to heatsink 302 such that the heat can dissipate to the external environment.

Figure 3B:
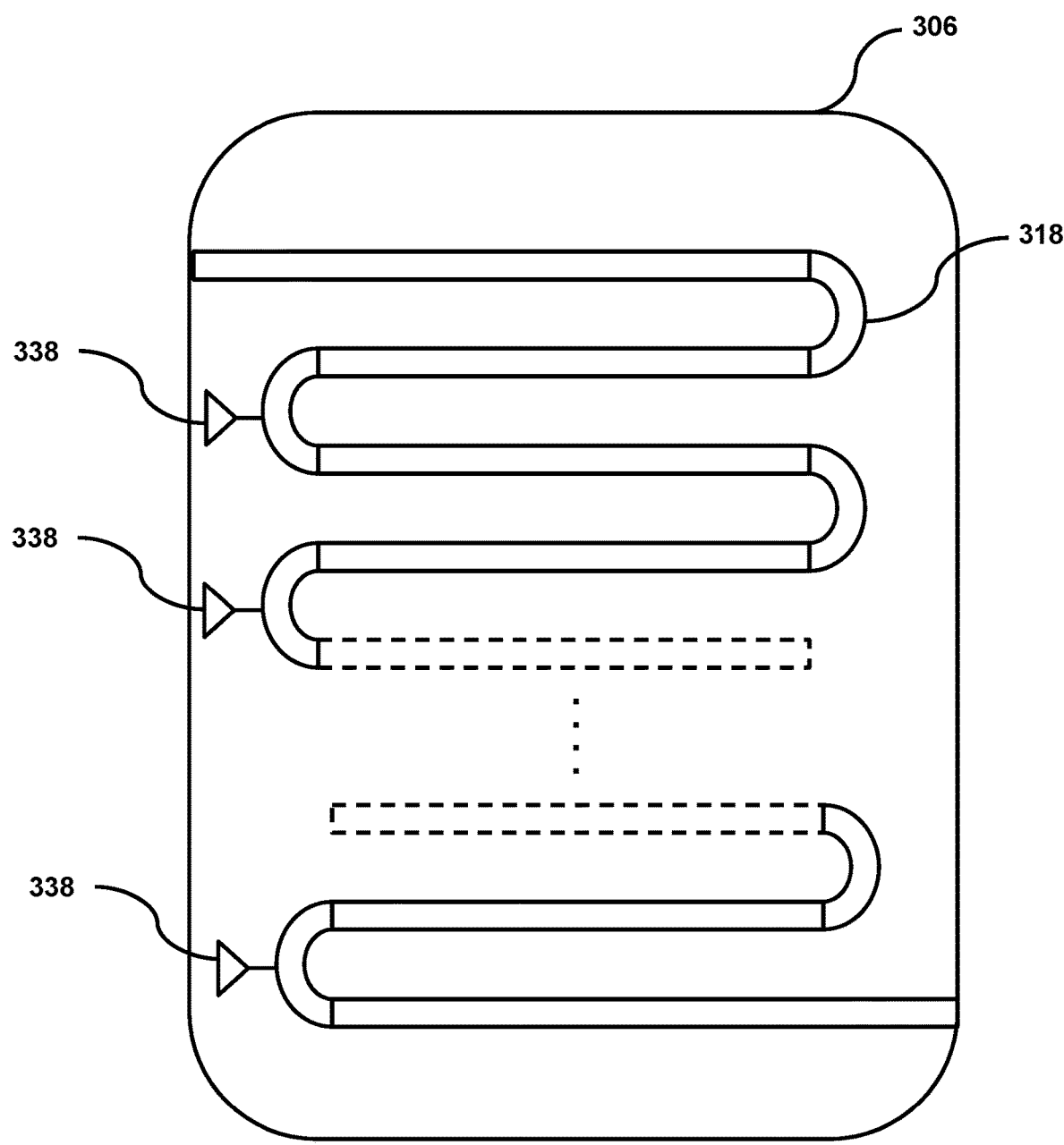
FIG. 3B illustrates a frequency scanned array card, in accordance with one or more embodiments.

Transmit antenna assembly 102 may use passive beam-steering circuits 320 to steer the electromagnetic radiation along the second spatial dimension. The beam-steering circuits 304 and 320 may cooperate to cause the beam to raster over a volume of space. For instance, if active beam-steering circuit 304 steer the electromagnetic radiation along the azimuthal dimension, then passive beam-steering circuits 320 may steer the electromagnetic radiation along the elevation dimension. However, the reverse could also be implemented. Each passive beam-steering circuit 320 may include a frequency scanned array card 306 and an array of antenna elements 308. As described above, the frequency scanned array cards can be used to steer a directionality of the output electromagnetic radiation by adjusting a frequency of a source signal used to generate a portion of the electromagnetic radiation output by a respective antenna element. In some embodiments, each frequency scanned array card 306 may include a trace with a length and configuration (e.g., resistance, inductance, and capacitance) is designed to effectuate a particular operating frequency or phase shift such that a respective portion of the electromagnetic radiation output by the corresponding antenna element has a desired frequency or phase shift. The superposition of the portions of the electromagnetic radiation generated by the antenna elements may determine a direction along a given axis that the beam is directed towards. As an example, with reference to FIG. 3B, frequency scanning array card 306 may include a trace 318, such as a wire, forming a pattern along which antenna elements 338 are located. The length of trace 318, and the pattern used, effectuate a particular phase shift for a given frequency by delaying a source signal by a specified amount for each of antenna elements 338. Although the pattern of trace 318 is somewhat symmetrical, different traces may have patterns that are repeating, non-repeating, symmetrical, asymmetrical, or in other manners. Likewise, antenna elements 338 along the pattern of trace 318 are depicted as somewhat symmetrically spaced, but antenna elements 338 can be spaced symmetrically, asymmetrically or in other manners, including on a plurality of traces. Additionally, although antenna elements 338 are depicted as connected to trace 318 in serial, antenna elements 338 can instead or additionally be connected in parallel or hierarchically. For ease of description, one representative antenna element 338 is depicted per connection to trace 318, which is not to disclaim that multiple antenna elements 338 connected to trace 318 at the same or substantially the same point.

Figure 3C:
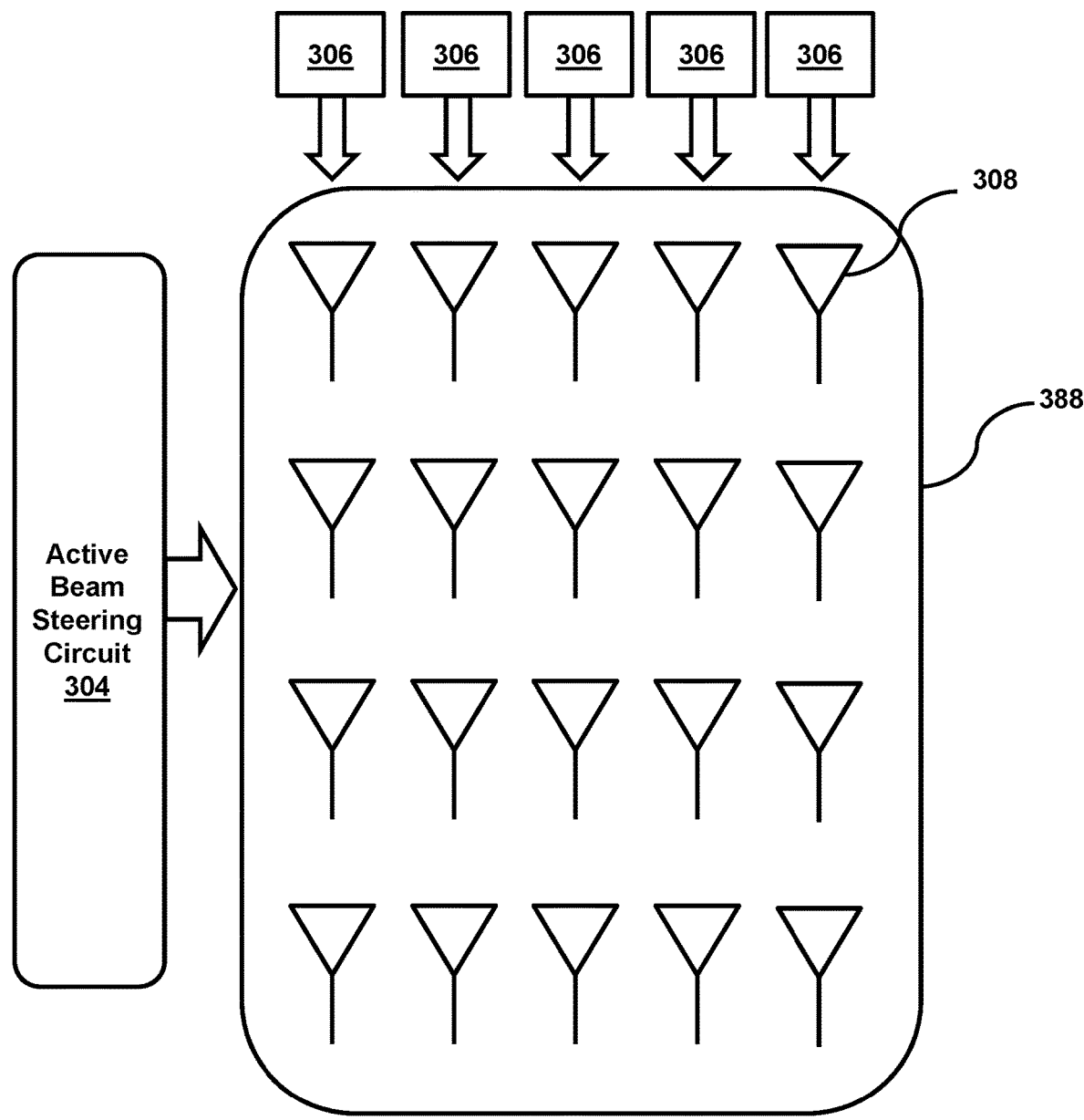
FIG. 3C illustrates an example array of antenna elements, in accordance with one or more embodiments.
Figure 3D:
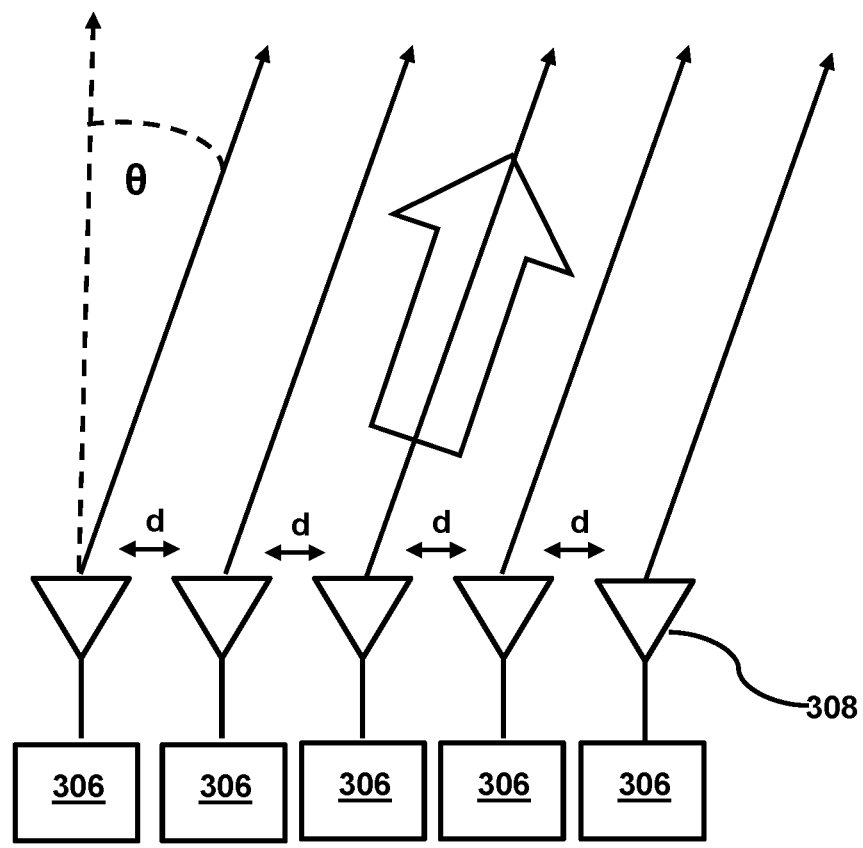
FIG. 3D illustrates an example electromagnetic beam generated by a set of antenna elements, in accordance with one or more embodiments.

In some embodiments, a quantity of passive beam-steering circuits 320 included within transmit antenna assembly 102 may vary depending on the operating parameters of radar assembly 100. For instance, the number "n" of passive beam-steering circuits 320 may be 1 or more, 10 or more, 50 or more, 100 or more, or other values. As each passive beam-steering circuit 320 may include (at least) one frequency scanned array card 306 and one array of antenna elements 308, the greater the quantity of passive beam-steering circuits 320 included within transmit antenna assembly 102, the greater the quantity of frequency scanned array cards 306 and antenna elements 308. In some embodiments, the quantity of passive beam-steering circuits included within transmit antenna assembly 102 may be determined based on the number of antenna elements to be included. For example, transmit antenna assembly 102 (as well as receive antenna assembly 104 or alternatively antenna assembly 202) may include between 8 and 64 antenna elements. As an example, with reference to FIG. 3C, an antenna assembly, such as transmit antenna assembly 102, may include an array of antenna elements 388 formed of rows and columns of antenna elements 308. An instance of frequency scanned array card 306 may be operatively coupled to antenna elements 308 along a respective column. Furthermore, active beam-steering circuit 304 may be operatively coupled along the rows of antenna elements 308 of the array of antenna elements 388. As seen, for example, with reference to FIG. 3D, antenna elements 308 may be separated from one another by a distance d. Distance d may be substantially equal to one half of the wavelength of the output (or received) electromagnetic beam. For example, for a Ku-band frequency, distance d may have a value of 0.6-1.3 cm. The combination of each component of the output radiation may form an overall electromagnetic beam that has a direction along a spatial axis defined by an angle θ. The spatial dimension may be the azimuthal or elevation dimension.

Transmit antenna assembly 102 may further include radome 310. Radome 310 may include a physical structure used to protect some or all of the components of transmit antenna assembly 102. For example, radome 310 may provide protection against environmental contaminates, e.g., rain, snow, ice, dirt, small objects, etc., as well as against possible human, vehicle, animal, or other larger objects, or combinations thereof. In some embodiments, radome 310 may be formed of a material that minimally attenuates the electromagnetic radiation output by antenna elements 308. For example, radome 310 may be formed using fiberglass or polytetrafluoroethylene (PTFE). In some embodiments, radome 310 may not be included, such as for radar assemblies that do not include moving antenna elements. Furthermore, a shape and size of radome 310 may be dependent on a variety of factors such as the number of antenna elements, the size of the antenna elements, the frequency range of the output electromagnetic radiation, a size of an enclosure used to enclose transmit antenna assembly 102, environmental conditions or other factors. For example, the size of radome 310 may be based on a size and shape of transmit antenna assembly 102, receive antenna assembly 104, or radar assembly 100 (or 200). In some cases, for example, transmit antenna assembly 102, receive antenna assembly 104, or radar assembly 100 (or 200), may have a volume between 5,000 and 40,000 cm$^3$.

As noted, FIG. 1 illustrates radar assembly 100, which may, in addition to transmit antenna assembly 102, include receive antenna assembly 104. Receive antenna assembly 104 may be constructed in a similar manner as transmit antenna assembly 102, with the exception that receive antenna assembly 104 may be configured to detect portions of the electromagnetic radiation output by transmit antenna assembly 102 that reflect off objects. Receive antenna assembly 104 may detect the reflected electromagnetic radiation and may determine features describing the object from which the electromagnetic radiation reflected.

Figure 3E:
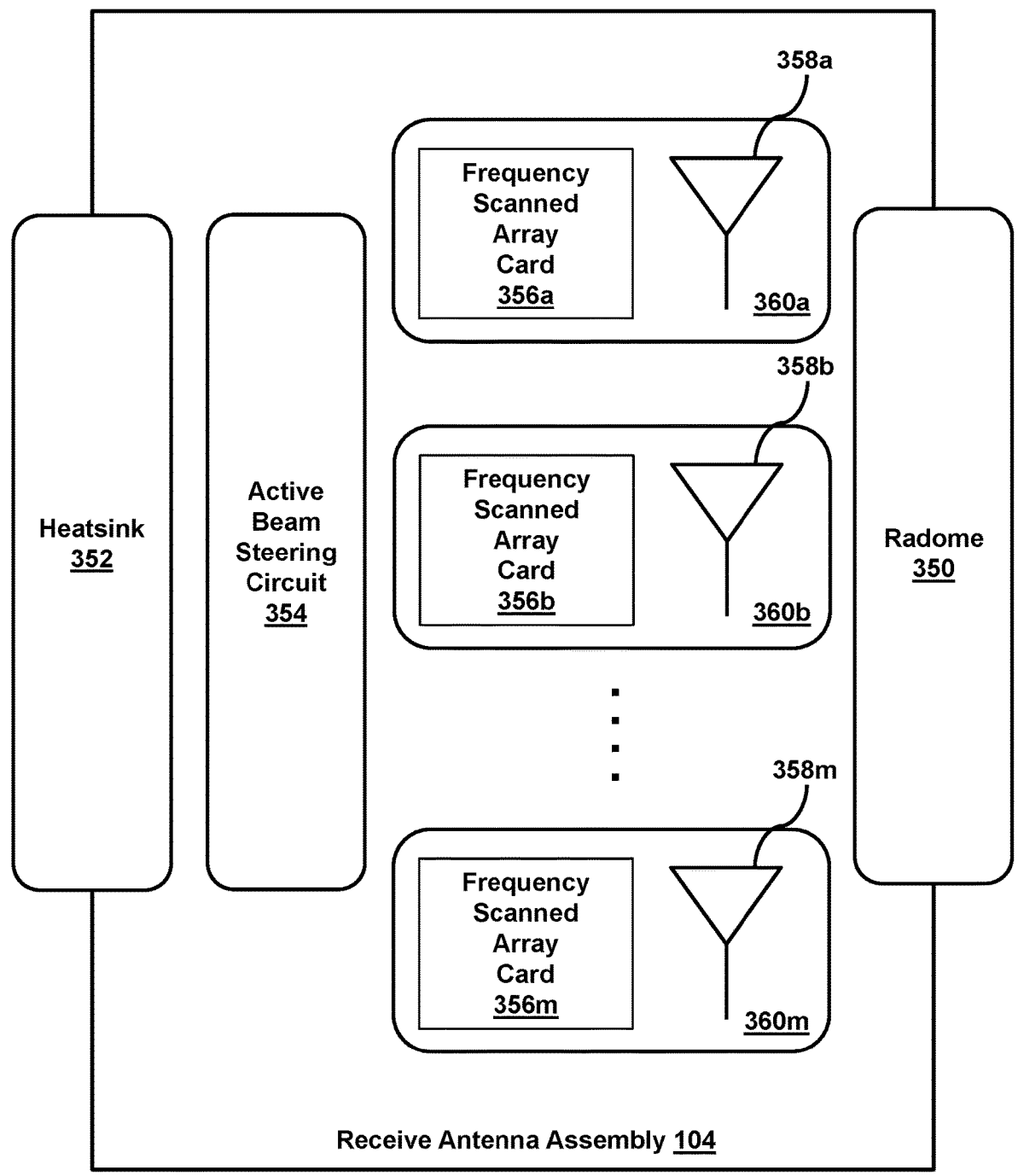
FIG. 3E illustrates an example receive antenna assembly, in accordance with one or more embodiments.

As an example, FIG. 3E shows receive antenna assembly 104 that may include heatsink 352, active beam-steering circuit 354, passive beam-steering circuits 360*a*-360*m*, radome 350, or other components. Passive beam-steering circuits 360 may each include (at least one) frequency scanned array cards 356 and an array of antenna elements 358. For example, passive beam-steering circuit 360*a* may include frequency scanned array card 356*a* and an array of antenna elements 358*a* (which may be one or more antenna elements 358*a* as previously described in reference to antenna elements 308), passive beam-steering circuit 360*b* may include frequency scanned array card 356*b* and an array of antenna elements 358*b*, and passive beam-steering circuit 360*m* may include frequency scanned array card 356*m* and an array of antenna elements 358*m*. For simplicity, as described herein, and unless otherwise specified, the labels "a" to "m" are omitted. The number "m" of passive beam-steering circuits 360 may be 1 or more, 10 or more, 50 or more, 100 or more, or other values. The greater the quantity of passive beam-steering circuits 360 included within receive antenna assembly 104, the greater the quantity of frequency scanned array cards 356 and antenna elements 358. Furthermore, the value "m" may be the same or different than the value "n." In some embodiments, a planar (or other two-dimensional or quasi-two dimensional) array of antenna elements may be square-planar (when n=m) or rectangular-planar (e.g., when n m). For instance, array of antenna elements 388 of FIG. 3C may represent a rectangular-planar assembly of antenna elements, which may be used to transmit, receive, or both.

In some embodiments, heatsink 352 and heatsink 302 may be the same heatsink or different instances of the same type of heatsink, and the description above relating to heatsink 302 may be used to describe heatsink 352. For instance, radar assembly 100 may include a single heatsink that serves to facilitate heat transfer from both transmit antenna assembly 102 and receive antenna assembly 104. In such cases, transmit antenna assembly 102 and receive antenna assembly 104 may be thermally connected to the heatsink. However, alternatively, heatsink 302 and heatsink 352 may be different heatsinks that may or may not be thermally connected to one another, as well as to the external environment. Furthermore, heatsink 302 and heatsink 352 may be separate heatsinks that are similarly or differently constructed.

In some embodiments, radome 310 and radome 350 may be the same radome, and the description above relating to radome 310 may be used to describe radome 350. As described in greater detail below, scenarios where radome 310 and radome 350 are the same single radome may correspond to some embodiment whereby the antenna elements of both antenna assemblies are shared. For instance, radar assembly 200 of FIG. 2 includes antenna assembly 202 whereby the antenna elements used to form the transmit antenna are the same as the antenna elements used to form the receive antenna. However, in some embodiments, radome 310 and radome 350 may be separate radomes formed in a same or different manner.

Active beam-steering circuit 354 may be substantially similar to active beam-steering circuit 304, with the exception that active beam-steering circuit 354 may be configured to control a direction with which receive antenna assembly 104 detects reflected electromagnetic radiation. For example, instead of controlling the direction of the output electromagnetic radiation from the that antenna elements, active beam-steering circuit 354 may control a direction of the detected (reflected) electromagnetic radiation. The reflected electromagnetic radiation may result from the output electromagnetic radiation being incident on an object, reflecting off that object, and traveling in an opposite direction back towards the radar. In some embodiments, active beam-steering circuit 354 may operate in conjunction with active beam-steering circuit 304 such that the antenna elements of both circuits 304 and 354 are operated in parallel, e.g., within 1 second of one another, within 1 millisecond of one another, within 1 nanosecond of one another, at substantially the same time, etc. In some embodiments, active beam-steering circuit 354 may operate in conjunction with active beam-steering circuit 304 such that the antenna elements of both circuits 304 and 354 are operated in a physical relationship, e.g., within 1 degree of one another, within 1 arcminute of one another, within 1 arcsecond of one another, at substantially the same angle, etc. This may allow the antenna elements to be oriented such that the reflected electromagnetic beam is easier to detect. Still further, some embodiments include a single active beam-steering circuit that is configured to control the directionality of the antenna elements for both transmit and receive operations. A single active beam-steering circuit may control the orientation of the antenna elements in batches (e.g., antenna elements 308 together and antenna elements 358 together, antenna elements along a row together whether those antenna elements are antenna elements 308 or antenna elements 358, etc.).

Passive beam-steering circuits 360 may also be substantially similar to passive beam-steering circuits 320, with the exception that passive beam-steering circuits 360 may be configured to control a direction from which receive antenna assembly 104 detects the reflected electromagnetic radiation. The direction that passive beam-steering circuits 360 control may be along a spatial dimension (which may be an angular dimension) different from the direction that active beam-steering circuit 354 controls. For example, active beam-steering circuit 354 may control the directionality of the detected reflected electromagnetic radiation along an azimuth dimension, whereas passive beam-steering circuits 360 may control the directionality of the detected reflected electromagnetic radiation along an elevation dimension.

Each passive beam-steering circuit 360 may include a frequency scanned array card 356 and an array of antenna elements 358. Frequency scanned array cards 356 may be configured similarly to frequency scanned array cards 306. In particular, frequency scanned array cards 356 may be configured to receive the reflected electromagnetic radiation, apply a reverse phase-shift, combine the resulting signals, and output the combined signal which can be used to infer information regarding the detected object (if any objects are detected). Thus, the functionality of frequency scanned array cards 356 may be substantially similar to that of frequency scanned array cards 306, with the exception that frequency scanned array cards 356 may operate during receive operations. Furthermore, some embodiments include frequency scanned array cards 306 and frequency scanned array cards 356 being the same set of frequency scanned array cards capable of steering the (transmitted) electromagnetic beam and receiving the (received) reflected electromagnetic beam.

In some embodiments, antenna elements 358 may be the same or similar to antenna elements 308, with the exception that antenna elements 358 may be configured to operate in "receive" mode whereby they detect reflected electromagnetic radiation, e.g., the electromagnetic radiation that reflects off of an object and is transmitted back towards the source. The number of antenna elements 358 may be the same or different than that of antenna elements 308. In some embodiments, a single set of antenna elements may be used for both transmission and reception as described in greater detail below with reference to FIG. 2.

As shown in FIG. 1, isolation component 106 may be configured to isolate transmit antenna assembly 102 from receive antenna assembly 104. In some embodiments, isolation component 106 may be a radio frequency (RF) isolator. In other words, isolation component 106 operates to ensure that the electromagnetic radiation output by transmit antenna assembly 102 is isolated from the electromagnetic radiation detected by receive antenna assembly 104. Doing so can prevent the receive elements from detecting signal output directly from the transmit elements, without reflecting off any objects.

Isolation component 106, e.g., an RF isolator, may refer to a device which isolates the receive antenna from signals emitted by the transmit antenna, including signals which may travel along electrical, communication, and other connections. Such a device may include two ports that transmit electromagnetic radiation in a single direction. In some embodiments, isolation component 106 may be a "non-reciprocal" device that applies a phase shift to power entering one of the ports to allow the phase-shifted power to be absorbed. The other port may be configured to transmit all of the power. Isolation component 106 may be a terminator circulator, a Faraday rotation isolator, a field-displacement isolator, or a resonance isolator. Isolation component 106 may be formed of a ferromagnetic material, such as magnetite ($Fe_3O_4$).

In some embodiments, isolation component 106 may refer to a device which isolates the receive antenna from signals emitted by the transmit antenna which may be transmitted through atmosphere or another medium (e.g., be un-reflected or via a direct path) or which may be reflected by one or more components of radar assembly 100 itself. Such an isolation component may consist of one or more materials which absorb or otherwise dampen transmitted signals, including metal materials such as aluminum or copper. In some embodiments, isolation component 106 may be a component which physically surrounds a receive antenna or sides of a receive antenna from direct transmission or self-reflected components. For example, isolation component 106 may be a Faraday cage or quasi-Faraday cage that blocks direct transmission paths between a transmit antenna and a receive antenna. In some embodiments, isolation component 106 may have an aperture or opening (including an aperture with a lens, filter, etc.) which allows transmission of reflected signals (e.g., reflected from objects within the scanned volume) while blocking transmission of direct signals. Isolation component 106 may be composed of a conductive material or mesh, where the material of the isolation component 106 may be conductive in the Ku-band and insulating in other parts of the EM spectrum.

In some embodiments, frequency conversion component 108 may be configured to take incoming power of a certain frequency and convert it into power of another frequency. As an example, frequency conversion component 108 may receive an incoming signal having a first frequency, e.g., 60 Hz, and convert the signal into a signal having a second frequency, e.g., 400 Hz. Frequency conversion component 108 may also be referred to herein interchangeably as a frequency converter. Some example types of frequency conversion components include rotary frequency converters and solid-state frequency converters. Rotary frequency converters use electrical energy to drive a motor, whereas solid-state frequency convertors may perform an AC to DC conversion.

Frequency conversion component 108 may operate to change a frequency of a signal by combining or mixing other frequencies. In particular, frequency conversion component 108 may implement a technique referred to as "heterodyning," where a signal in one frequency range is shifted to another frequency range. For example, given two signals, two new signals may be created therefrom by determining the summation and difference of the two new signals, which are referred to as "heterodynes." Some examples for using frequency conversion include shifting a signal from one frequency band to another frequency band.

Power distribution component 110 may be configured to control an amount of power distributed to other components of radar assembly 100 (or 200). For example, power distribution component 110 may be configured to generate and provide electrical power to active beam-steering circuits 304, 354. Some example types of power distribution components include a centralized power supply, a distributed power supply, or a layered and fused power supply. Centralized power supplies may include components for rectification, filtering, step-down and voltage stabilization that are distributed in a unit. Due to its low cost and ease of use, centralized power supplies are often used by low power radar assemblies. Distributed power supplies have each load corresponding to a separate power supply system. Together, the separate power supply systems form the distributed power supply. Layered and fused power supplies may include a centralized rectification and decentralized voltage stabilization.

Computing system 112 may include components such as memory storing data, program instructions, or other information, interfaces, processors, or other components. As an example, computing system 112 may include a graphics processing unit (GPU). Computing system 112 may be configured to control the operations of each component of radar assembly 100. For example, computing system 112 may instruct power distribution component 110 to generate a signal to be provided to transmit antenna assembly 102 for effectuating the phase shift imparted by each portion of the output electromagnetic radiation. A more detailed example of the components included by computing system 112 is provided below with reference to FIG. 10.

Figure 3F:
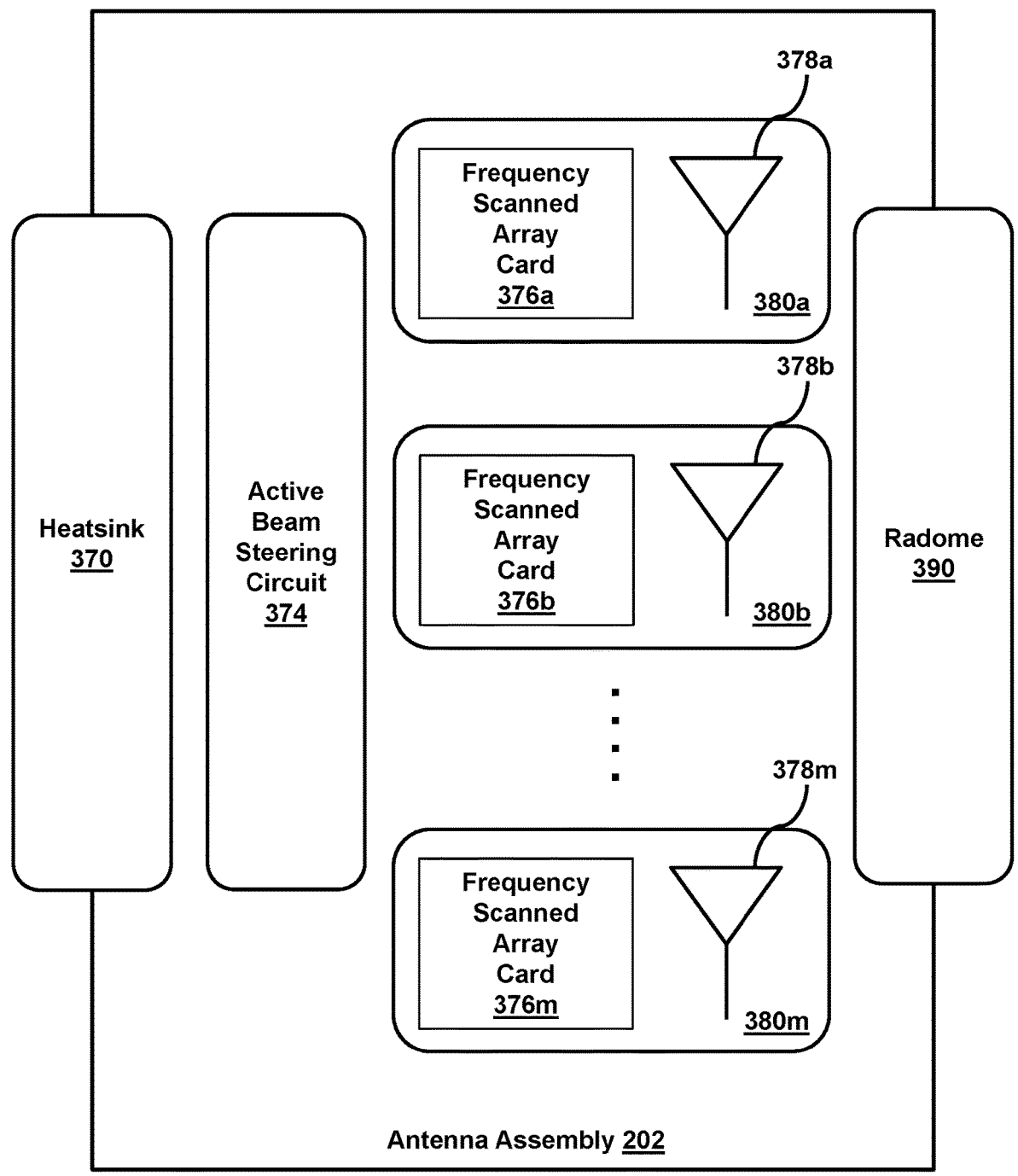
FIG. 3F illustrates an example transmit/receive antenna assembly, in accordance with one or more embodiments.

As shown in FIG. 2, radar assembly 200 may be substantially similar to radar assembly 100 with the exception that radar assembly 200 includes a single antenna assembly 202 and T/R module 220 (including multiple T/R modules as previously described), as opposed to transmit antenna assembly 102 and receive antenna assembly 104. As an example, with reference to FIG. 3F, antenna assembly 202 may include heatsink 370, active beam-steering circuit 374, passive beam-steering circuits 380, e.g., passive beam-steering circuits 380a, 380b, . . . , 380n, radome 390, or other components. Heatsink 370 and radome 390 may be substantially similar to heatsink 302 and radome 310 of transmit antenna assembly 102, and the previous description may apply. Active beam-steering circuit 374 may be substantially similar to active beam-steering circuit 304 and active beam-steering circuit 354, with the exception that active beam-steering circuit 374 may facilitate both transmit and receive operations. Passive beam-steering circuits 380 may be substantially similar to passive beam-steering circuits 320 and 360, with the exception that passive beam-steering circuit 380 may facilitate both transmit and receive operations. Each passive beam-steering circuit 380 may include a frequency scanned array card 376, e.g., frequency scanned array card 376a, 376b, 376n, and an array of antenna elements 378 e.g., arrays of antenna elements 378a, 378b, 378n (for which a representative antenna element 378a, 378b, 378c is depicted and which may contain one or more antenna elements 378). Frequency scanned array card 376 may be substantially similar to frequency scanned array cards 306 and 356, as it can facilitate passive phase-shifting to control a direction of transmitted electromagnetic radiation and detectable reflected electromagnetic radiation. Antenna elements 378 may be substantially similar to antenna elements 308 and 358, and may facilitate transmission of electromagnetic radiation directed at a location in space as well as reception of any reflected electromagnetic radiation from objects located in a volume in space specified by the location.

T/R modules or switches may be used in active beam-steering circuit 374 to enable antenna elements 378 to operate in both transmit and receive modes. T/R modules may be used to boost output power of the electromagnetic radiation transmitted by radar assembly 200, identify a baseline noise spectrum for receive operations, and may further provide control for steering the electromagnetic radiation, e.g., beam-steering. T/R modules may be sized to fit within the array of antenna elements, e.g., antenna elements 378, and may have a size that is related to the wavelength of the system. For example, a system operating at 18 GHz may include a T/R module having a size 0.835 cm in a dimension, corresponding to the wavelength of the 18 GHz system.

T/R module 220 may enable operations in both transmit and receive operations for antenna assembly 202 may occur within 1 second of one another, within 1 millisecond of one another, within 1 nanosecond of one another, etc.; however this is not a requirement. T/R module 220 may include a duplexer, a signal isolator, a limiter, a low-noise amplifier, a phase shifter, a high-power amplifier, an attenuator, a power conditioner, modulation circuitry, a capacitor or other charge storage device, beam-steering circuitry, or other components. Various of these elements may also be present in transmit antenna assembly 102 or receive antenna assembly 104, including as components of active beam-steering circuit 304 (or 354).

The duplexer allows antenna elements 378 to be used for both transmit and receive operations. The duplexer may be formed from a ferromagnetic material and in some cases may be disposed outside of the T/R module's enclosure. The isolator may be used to match the load to antenna elements 378 and prevent power degradation. The limiter may prevent damage to the low-noise amplifier during transmit operations, as well as at other times when there is additional radiation. The limiter may also be used to absorb reflected power occurring during transmission. The reflected power here differs from the reflected electromagnetic radiation, as this refers to internal reflection or more generally reflection not due to the output electromagnetic radiation reflecting off an object in a target location external to radar assembly 200. The low-noise amplifier may be configured to minimize attenuation of long transmission lines, provide good impedance matching, and may provide termination so that the isolator can be removed (if desired). The phase shifter may apply a desired phase shift to a given component of the electromagnetic radiation output by antenna elements 378 during transmissions and may also provide phase-shifting for the reflected electromagnetic radiation detected by antenna elements 378. The high-power amplifier may be configured to amplify the power of the transmitted electromagnetic radiation, the power of the received electromagnetic radiation, or both. The attenuator may be used to reduce a magnitude of the sidelobes of the received electromagnetic radiation and can also be used to minimize the sidelobes of the transmitted electromagnetic radiation. The power conditioner may be used to "clean" the power such that excess voltage within the system is reduced. The modulation circuitry may be used to switch T/R modules from operating in transmit mode to operating in receive mode, and vice versa. The modulation circuitry may do so quickly by turning off the transmit gain path during receive operations, and by biasing off the receive amplifier path during transmit operations. The charge storage device, e.g., a capacitor, may be used to store charges to be used to maintain the amplified bias voltage. The beam-steering circuitry may be used to control an amount of phase shift to be applied to each component of the electromagnetic radiation produced by (during transmit or receive) antenna elements 378.

While T/R modules 220 can be used by radar assembly 200 to allow for a combined transmit/receive antenna assembly, e.g., antenna assembly 202, T/R modules 220 can increase the complexity of the circuitry used to fabricate radar assembly 200. Furthermore, the power of the transmitted electromagnetic radiation may need to be increased relative to the power needed for a stand-alone transmit antenna assembly, e.g., transmit antenna assembly 102. Therefore, the use of T/R modules 220 may depend on the constraints of the system and manufacturer.

Figure 4:
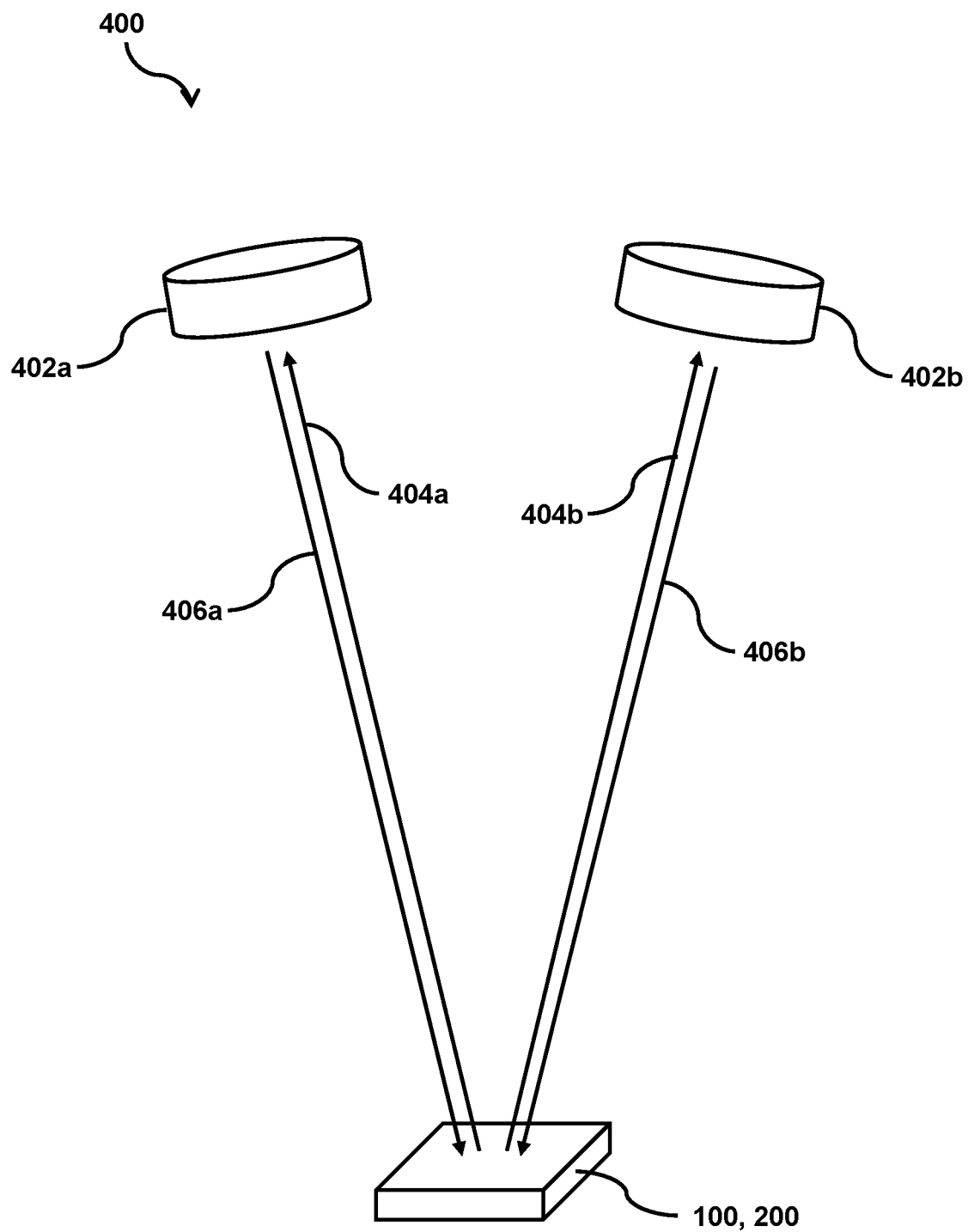
FIG. 4 illustrates an example use case of the radar assembly, in accordance with one or more embodiments.

FIG. 4 illustrates an example use case of radar assembly 100 or 200, in accordance with one or more embodiments. In example 400, radar assembly 100, 200 may be configured to transmit electromagnetic radiation 404a in a first direction. Radar assembly 100, 200, as mentioned above, may steer electromagnetic radiation 404a such that it is directed to a location in physical space where a determination can be made as to whether any objects are located in a volume associated with that location. If an object is located in that volume, such as object 402a, then electromagnetic radiation 404a may reflect off of object 402a. For instance, reflected electromagnetic radiation 406a may result from electromagnetic radiation 404a reflecting off object 402a. In some embodiments, radar assembly 100, 200 may be configured to adjust a direction that electromagnetic radiation 404a is directed towards. For example, radar assembly 100, 200 may steer the electromagnetic radiation (actively, passively, or a combination of both actively and passively) to be directed towards another location in physical space to determine whether any objects are located within another volume associated with the new location. Radar assembly 100, 200 may also be configured to determine whether objects detected in the new location's volume are the same as the objects detected within the previous location's volume. As an example, radar assembly 100, 200 may steer electromagnetic radiation 404b to be output in a direction different from the direction that electromagnetic radiation 404a is in. In some embodiments, electromagnetic radiation 404b may determine whether any objects are located in the volume associated with the steered location. If an object is located in that volume, such as object 402b, then electromagnetic radiation 404b may reflect off object 402b and reflect back, e.g., reflected electromagnetic radiation 406b, towards radar assembly 100, 200.

Based on the reflected electromagnetic radiation 406a, 406b, radar assembly 100, 200 may be configured to determine whether object 402a is the same object as object 402b. If so, radar assembly 100, 200 may determine characteristics of the object, such as a size, shape, velocity, acceleration, etc. Furthermore, if object 402a and object 402b are different from one another, radar assembly 100, 200 may determine separate features relating to objects 402a and 402b.

In some embodiments, radar assembly 100, 200 may be configured to determine a range of an object based on the round-trip time delay between signal transmission and receipt of the reflected signal. In some embodiments, radar assembly 100, 200 may estimate an angular location of a detected object based the direction of the transmit beam and receive beam when the object was detected. In some embodiments, radar assembly 100, 200 may estimate the angular location of a detected target based on constructive and destructive interference of the reflected signal detected at different locations on the receiver antenna assembly or on different antenna elements of the receiver antenna assembly. In some embodiments, radar assembly 100, 200 may be configured to determine a range rate of an object based on measurement of the frequency shift (e.g., Doppler shift) between the transmit signal and the reflected receive signal.

Radar assembly 100, 200 may scan a volume of space in an orderly manner, in a random manner, may scan along a predicted track of a previously identified object, etc. Radar assembly 100, 200 may scan along substantially all elements in a first direction and then adjust a position (using active or passive beam-steering) in a second direction and then scan again along substantially all elements in the first direction. For example, radar assembly 100, 200 can operate in a raster scan or quasi-raster scan, interlaced scan, sweep scan, etc. In some embodiments, radar assembly 100, 200 can operate in multiple scan modes, including based on whether or not an object has been detected. For example, radar assembly 100, 200 may track an object once it is detected (such as an object larger than a size threshold, moving faster than a velocity threshold, etc.). In some embodiments, radar assembly 100, 200 may track an object until it disappears from a field of view or falls below a threshold (e.g., size, speed). In some embodiments, radar assembly 100, 200 may search near a detected object to locate other objects which may accompany the first object. In some embodiments, radar assembly 100, 200 may search near a position or last known position of an object which disappears or is no longer detected.

Figure 5:
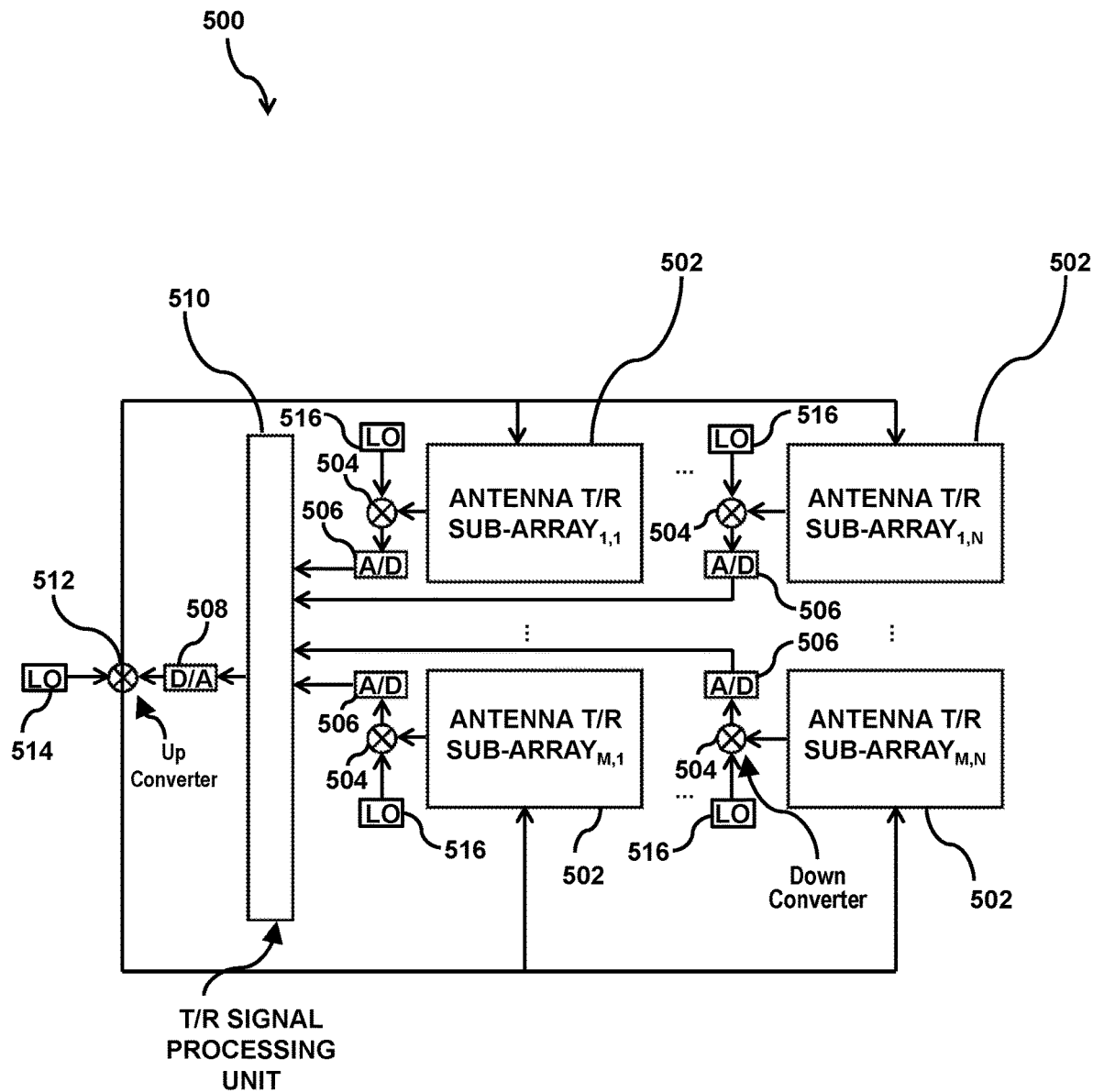
FIG. 5 illustrates an example architecture for an array of antenna T/R sub-arrays, in accordance with one or more embodiments.

FIG. 5 illustrates an example architecture for array 500 of antenna T/R sub-arrays 502 in a transmit and receive radar assembly. Array 500 may be an architecture of radar assembly 200. Array 500 is comprised of antenna T/R sub-arrays 502. Antenna T/R sub-arrays 502 may be organized in a planar or quasi-planar array, such that antenna T/R sub-arrays 502 are located along a first direction (for example a row) and along a second direction (for example a column). Antenna T/R sub-arrays 502 may function as individual transmitter antenna and receiver antennas. When transmitting, antenna T/R sub-arrays 502 may receive one or more transmission signal (or signal corresponding to a signal to be transmitted) from T/R signal processing unit 510. T/R signal processing unit 510 may receive signals from or be in communication with transmitted from computing system 112, frequency conversion component 108, power distribution component 110, T/R module 220, etc. The transmission signal output by T/R signal processing unit 510 may be a digital signal and may input into D/A converter 508. Alternatively, T/R signal processing unit 510 may output an analog signal or contain within itself a D/A converter. The output from D/A converter 508 (or alternatively from T/R signal processing unit 510 may be input to an up converter 512 that may use the output from a local oscillator (LO) 514. T/R signal processing unit 510 may correspond to at least one, substantially one, exactly one, multiple, etc. D/A converters 508 and up converters 512. D/A converter 508 and up converter 512 are depicted as operating on an output signal from T/R signal processing unit 510, but can instead operate on multiple (including multiplexed) signals output by T/R signal processing unit 510.

When receiving, antenna T/R sub-arrays 502 may transmit one or more received signals (or signal generated as a result of a received signal) to down converter 504 that may use the output from a local oscillator (LO) 516. Each of the antenna T/R sub-arrays 502 may correspond to at least one, substantially one, exactly one, etc. down converter 504. After the received signal is down converted 504, it may be input into A/D converter 506. Each of the antenna T/R sub-arrays 502 or down converter 504 may correspond to at least one, substantially one, exactly one, etc. A/D converter 506. Alternatively, received signals from each of the antenna T/R sub-arrays 502 can be batched or multiplexed and fed into one or more A/D converter 506. The received signal is then output to T/R signal processing unit 510.

Figure 6:
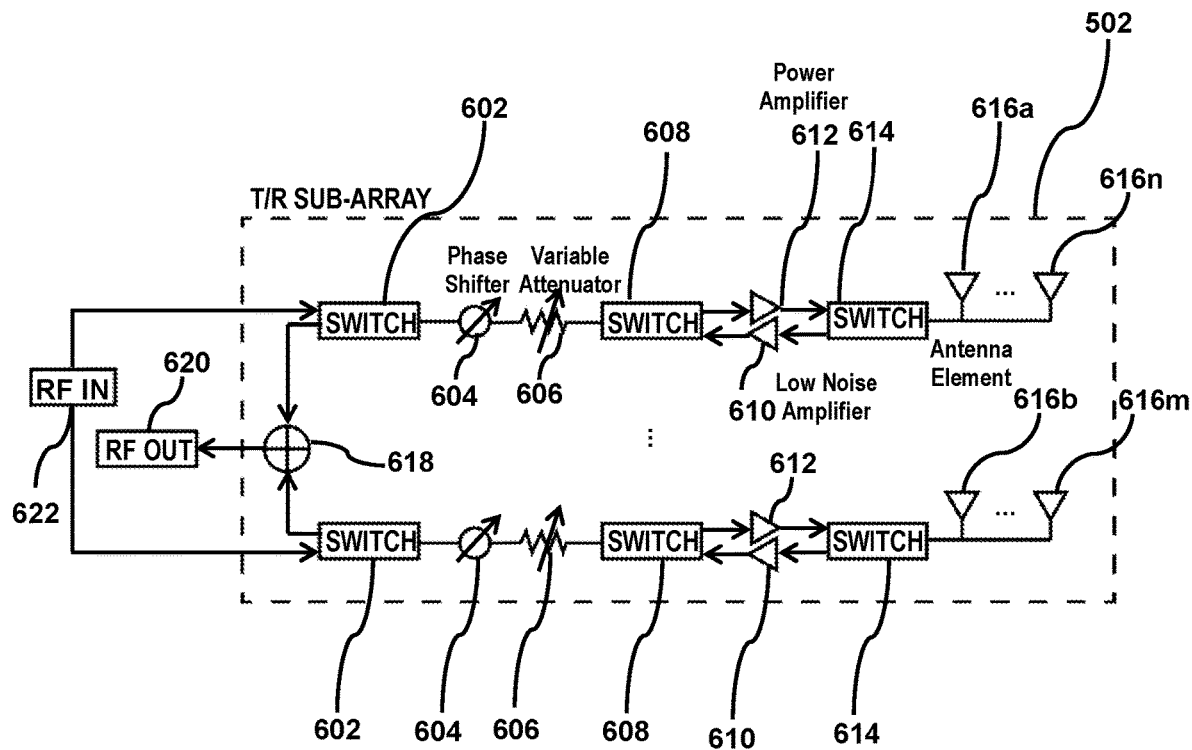
FIG. 6 illustrates an example T/R sub-array comprising antenna elements, in accordance with one or more embodiments.

FIG. 6 illustrates an example antenna T/R sub-array 502. The entire collection of sub-arrays 502 within 500 may provide an implementation of active beam-steering circuit 374 and a plurality of passive beam-steering circuits 380 within antenna assembly 202. Antenna T/R sub-array 502 is provided to illustrate an example of antenna T/R sub-array components, which is not to say that other architectures are prohibited. Antenna T/R sub-array 502 is depicted as comprising antenna elements 616a-616n and antenna elements 616b-616m. Antenna elements 616 may correspond to antenna elements 378 of FIG. 3F, where antenna elements 616a-616n may correspond to antenna elements 378a, antenna elements 616b-616m may correspond to antenna elements 378b, etc. Antenna T/R sub-array 502 comprises one or more switches 602, 608, and 614. Switches 602, 608, and 614 function in tandem to ensure that antenna T/R sub-array 502 operates in either transmit or receive mode. In transmit mode, antenna T/R sub-array 502 receives an RF signal, here depicted as RFin 622. RFin 622 may be output by T/R signal processing unit 510 and processed or altered by one or more intervening circuit elements. RFin 622 may be split along one or more parallel transmission lines, where each transmission line may correspond to a frequency scanned array of antenna elements 616 (e.g., antenna elements 616a-616n, antenna elements 616b-616m, etc. and where antenna elements 616a-616n may correspond to a first transmission line, antenna elements 616b-616m may correspond to a second transmission line, etc.). RFin 622 may be input to one or more of the one or more switches 602 for each of the one or more transmission lines. In transmit mode, RFin 622 may be phase shifted by phase shifter 604 or attenuated by variable attenuator 606. RFin 622 may be differently phase shifted by phase shifter 602 or differently attenuated by variable attenuator 606 for each transmission line. After RFin 622 is phase shifted or attenuated, RFin 622 may be input into one or more switches 608. In transmit mode, switch 608 may route RFin 622 to power amplifier 612. In transmit mode, switch 614 may then route RFin 622 to a frequency scanned array of antenna elements 616. The path of RFin 622 in transmit mode may be depicted by the route corresponding to arrows pointing towards antenna elements 616. Although three switches are depicted for a transmission line (e.g., one or more switches 602, one or more switches 608, and one or more switches 614), more or fewer switches may be present. For example, each antenna element 616 may include or be in communication with a dedicated switch, each column may be associated with a switch, each row may be associated with a switch, etc. Antenna elements 616 are depicted for each transmission line, where each transmission line may have one or more antenna elements 616, the same number of antenna elements 616, different numbers of antenna elements 616, etc.

The frequency scanned array of antenna elements 616 measures a received signal, here depicted as RFout 620. From the array of antenna elements 616, RFout 620 is input into one or more switches 614. The one or more switched 614 may then route RFout 620 to low noise amplifier 610. The path of RFout 620 in receive mode may be depicted by the route corresponding to arrows pointing away from antenna elements 616. In some embodiments, other low noise filtering circuitry can be used instead or in addition to low noise amplifier 610. From low noise amplifier 610, RFout 620 may be input into one or more switch 608. From one or more switches 608, RFout 620 can be input into variable attenuator 606 or phase shifter 604. In some embodiments, phase shifter 604 and variable attenuator 606 can operate symmetrically, selectively, or asymmetrically on signals (e.g., RFin 622 or RFout 620). For example, variable attenuator 606 may operate on RFout 620 and may not operate on RFin 622 (or on RFin 622 in some instances). From phase shifter 604, RFout 620 corresponding to one or more transmission lines may be summed by summation operator 618. Alternatively, RFout 620 corresponding to one or more transmission lines may be multiplexed. RFout 620 may then be output or otherwise communicated to T/R signal processing unit 510.

Figure 7:
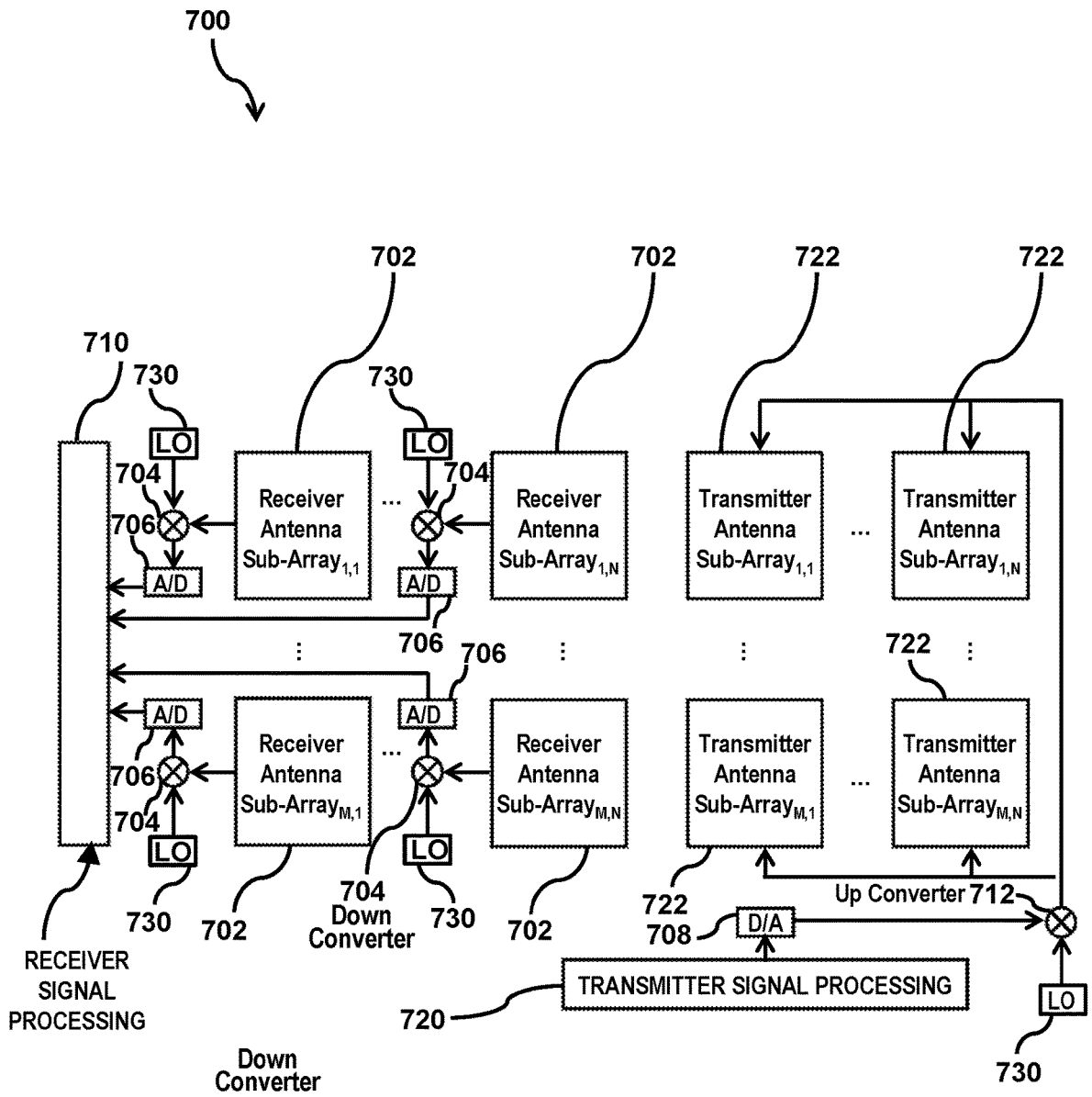
FIG. 7 illustrates an example architecture for an array of receiver antenna sub-arrays and transmitter antenna sub-arrays, in accordance with one or more embodiments.

FIG. 7 illustrates an example architecture for array 700 of receiver antenna sub-arrays 702 and transmitter antenna sub-arrays 722. Array 700 may be an architecture of radar assembly 100. Array 700 is comprised of receiver antenna sub-arrays 702 and transmitter antenna sub-arrays 722. Receiver antenna sub-arrays 702 and transmitter antenna sub-arrays 722 may be organized in a planar or quasi-plana array, such that receiver antenna sub-arrays 702 and transmitter antenna sub-arrays 722 are located along a first direction (for example a row) and along a second direction (for example a column). Receiver antenna sub-arrays 702 and transmitter antenna sub-arrays 722 are depicted as being arranged in a block of receiver antenna sub-arrays 702, which extends in both a first direction and a second direction, and a block of transmitter antenna sub-arrays 722, which also extends in both a first direction and a second direction. As depicted, the set of receiver antenna sub-arrays 702 is adjacent to the set of transmitter antenna sub-arrays 722, such that each row of array 700 contains receiver antenna sub-arrays 702 and transmitter antenna sub-arrays 722 while columns of the array 700 contain either receiver antenna sub-arrays 702 or transmitter antenna sub-arrays 722. However, the arrangement of receiver antenna sub-arrays 702 and transmitter antenna sub-arrays 722 may be different, including co-planar, offset, interstitial, three-dimensional, etc. In some embodiments, receiver antenna sub-arrays 702 and transmitter antenna sub-arrays 722 are interspersed or co-planar or substantially co-planar. Receiver antenna sub-arrays 702 and transmitter antenna sub-arrays may occupy the same or different (e.g., alternating) positions in a first direction (e.g., row) and a second direction (e.g., column). Array 700 may contain the same or a different number of receiver antenna sub-arrays 702 and transmitter antenna sub-arrays 722.

Receiver antenna sub-arrays 702 may receive at the same time (or at substantially the same time) as transmitter antenna sub-arrays 722 transmit. Receiver antenna sub-arrays 702 may operate to receive signals at substantially all times, in intervals, at substantially the same times, at different times, etc. Transmitter antenna sub-arrays 722 may operate to transmit signals at substantially the same time, at substantially the same time for transmitter antenna sub-arrays 722 of a first direction, at substantially the same time for transmitter antenna sub-arrays 722 of a second direction, etc. In some embodiments, receiver antenna sub-arrays 702 or transmitter antenna sub-arrays 722 may cycle through active receive/transmit phases and rest or off phases. When receiving, receiver antenna sub-arrays 702 output a received signal (or signal corresponding to a received signal) to circuitry which may include or operate as a down converter 704 utilizing a local oscillator (LO) 730 or other frequency source. Each receiver antenna sub-array 702 may correspond to substantially one down converter 704, which may output the received signal to A/D converter 706. Each down converter 704 may correspond to substantially one A/D converter 706. For received signals which are phase shifted, output of receiver antenna sub-arrays 702 may be summed or multiplexed and passed through less than one down converter 704 (or A/D converter 706). From A/D converter, received signals are input to a receiver signal processing unit 710.

When transmitting, a transmitter signal processing unit 720 transmits a signal for transmission (or a signal that corresponds to a signal to be transmitted). The transmission signal is input into D/A converter 708 for conversion into an analog signal. Alternatively, the transmitter signal processing unit 720 may contain a D/A converter or output an analog signal. The transmission signal is input into up converter 712 or other circuitry which may include or operate as an up converter utilizing a local oscillator (LO) 730 or other frequency source. Up converter 712, like down converter 704, may also receive as input a power source, control voltage, etc. From up converter 712, the transmission signal is input into transmitter antenna sub-arrays 722. Transmitter antenna sub-arrays 722 may receive the same signal, portions (such as selected by one or more switches) of the same signal, demultiplexed portions of the same signal, etc. Transmitter signal processing unit 720 may correspond to one or more D/A converters 708 or one or more up converters 712.

In some embodiments, receiver signal processing unit 710 and transmitter signal processing unit 720 may be in communication or may be the same unit. Receiver signal processing unit 710 and transmitter signal processing unit 720 may be different from a T/R signal processing unit, such as T/R signal processing unit 510, in that they may not include control circuitry or generate signals to switch one or more antenna T/R sub-array (such as antenna T/R sub-array 502) between transmission and reception modes.

Figure 8:
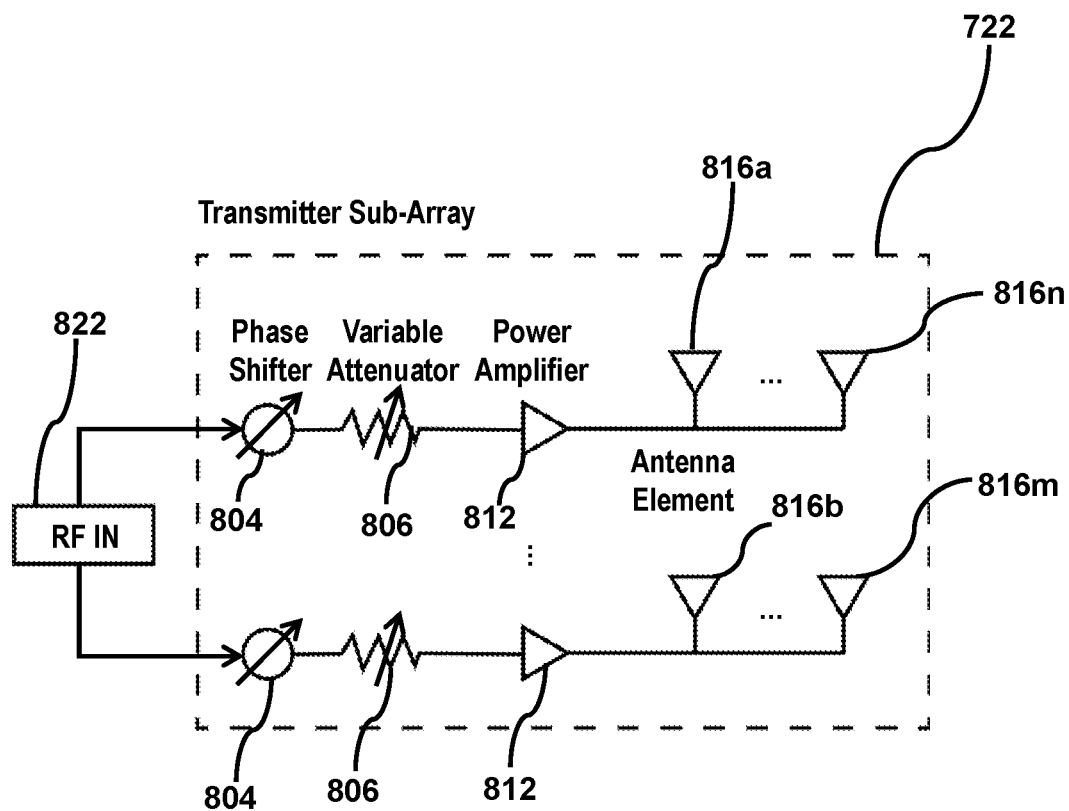
FIG. 8 illustrates an example transmitter sub-array comprising antenna elements, in accordance with one or more embodiments.

FIG. 8 illustrates an example transmitter sub-array 722. The entire collection of sub-arrays 722 within 700 provide an implementation of an active beam-steering circuit 304 and a plurality of passive beam-steering circuits 320 within transmit antenna assembly 102. Antenna transmitter sub-array 722 is provided to illustrate an example of antenna transmitter sub-array components, which is not to say that other architectures are prohibited. Antenna transmitter sub-array 722 is depicted as comprising antenna elements 816a-816n and antenna elements 816b-816m. Antenna elements 816 may correspond to antenna elements 308 of FIG. 3A, where antenna elements 816a-816n may correspond to antenna elements 308a, antenna elements 816b-816m may correspond to antenna elements 308b, etc. Transmitter sub-array 722 receives an RF signal, here depicted as RFin 822. RFin 822 may be output by a T/R signal processing unit or by a transmitter signal processing unit, such as transmitter signal processing unit 720, and processed or altered by one or more intervening circuit elements. RFin 822 may be split along one or more parallel transmission lines, where each transmission line may correspond to a frequency scanned array of antenna elements 308. RFin 822 may be controlled by one or more switches, including switches which select one or more of the one or more transmission lines. RFin 822 may be phase shifted by phase shifter 804 or attenuated by variable attenuator 806. RFin 822 may be differently phase shifted by phase shifter 804 or differently attenuated by variable attenuator 806 for each transmission line. RFin 822 may then be amplified by power amplifier 812 prior to transmission through the frequency scanned array of antenna elements 816. Antenna elements 816 (e.g., antenna elements 816a-816n, antenna elements 816b-816m, etc. and where antenna elements 816a-816n may correspond to a first transmission line, antenna elements 816b-816m may correspond to a second transmission line, etc.) are depicted for each transmission line, where each transmission line may have one or more antenna element 816, the same number of antenna elements 816, different numbers of antenna elements 816, etc.

Figure 9:
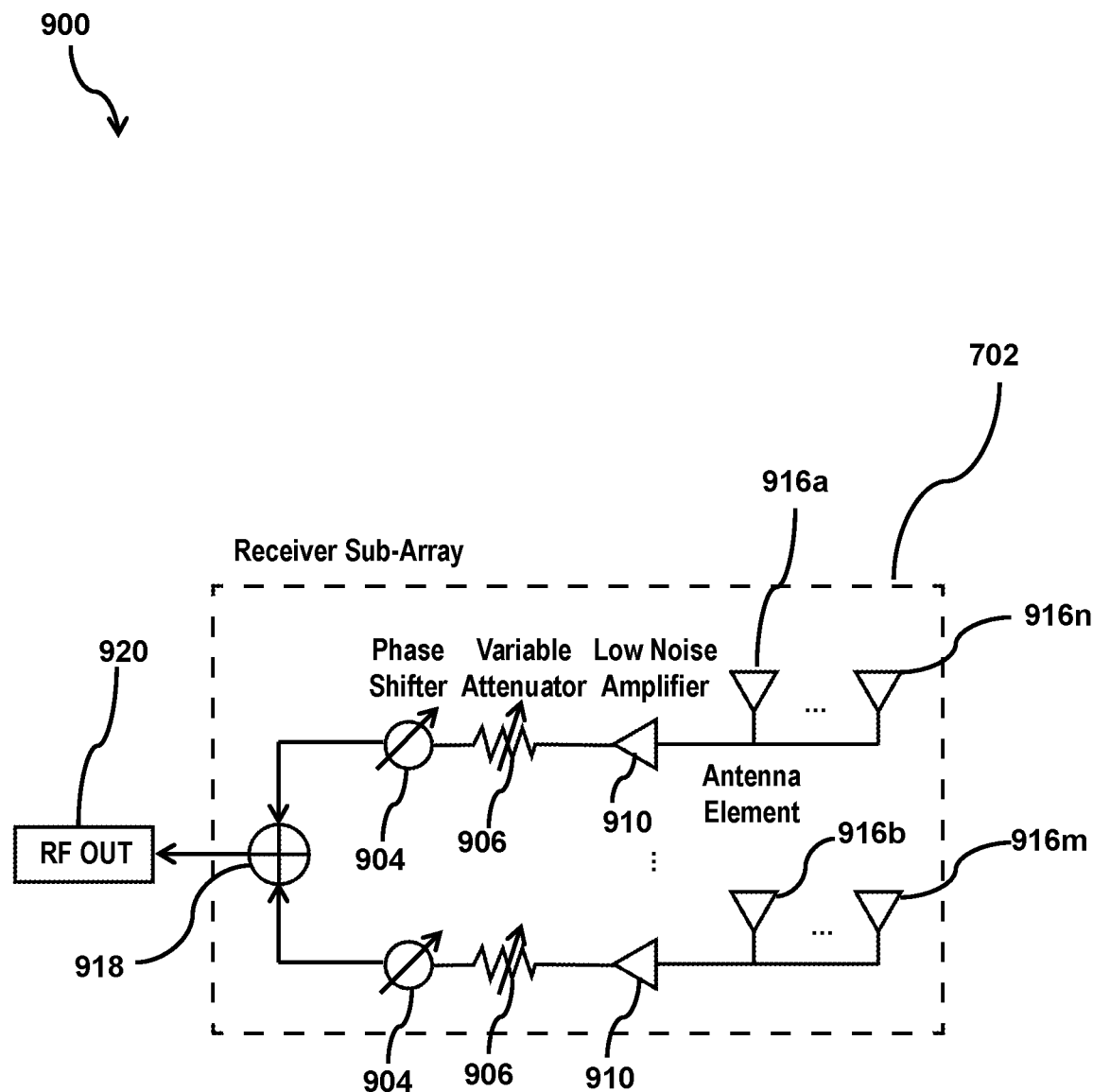
FIG. 9 illustrates an example receiver sub-array comprising antenna elements, in accordance with one or more embodiments.

FIG. 9 illustrates an example receiver sub-array 702. The entire collection of sub-arrays 702 within 700 provide an implementation of an active beam-steering circuit 354 and a plurality of passive beam-steering circuits 360 within receive antenna assembly 104. Antenna receiver sub-array 702 is provided to illustrate an example of antenna receiver sub-array components, which is not to say that other architectures are prohibited. Antenna receiver sub-array 702 is depicted as comprising antenna elements 916a-916n and antenna elements 916b-916m. Antenna elements 916 may correspond to antenna elements 358 of FIG. 3E, where antenna elements 916a-916n may correspond to antenna elements 358a, antenna elements 916b-916m may correspond to antenna elements 358b, etc. A frequency scanned array of antenna elements 916 measures a received signal, here depicted as RFout 920. Antenna elements 916 (e.g., antenna elements 916a-916n, antenna elements 916b-916m, etc. and where antenna elements 916a-916n may correspond to a first transmission line, antenna elements 916b-916m may correspond to a second transmission line, etc.) are depicted for each transmission line, where each transmission line may have one or more antenna element 916, the same number of antenna elements 916, different numbers of antenna elements 916, etc. From the array of frequency scanned antenna element 916, RFout is input into low noise amplifier 910. In some embodiments, other low noise filtering circuitry can be used instead or in addition to low noise amplifier 910. From low noise amplifier 910, RFout 920 may be input into variable attenuator 906 and phase shifter 904. From phase shifter 904, RFout 920 corresponding to one or more transmission lines may be summed by summation operator 918. Alternatively, RFout 920 corresponding to one or more transmission lines may be multiplexed. RFout 920 may then be output or otherwise communicated to T/R signal processing unit or a receiver signal processing unit, such as receiver signal processing unit 710.

Figure 10:
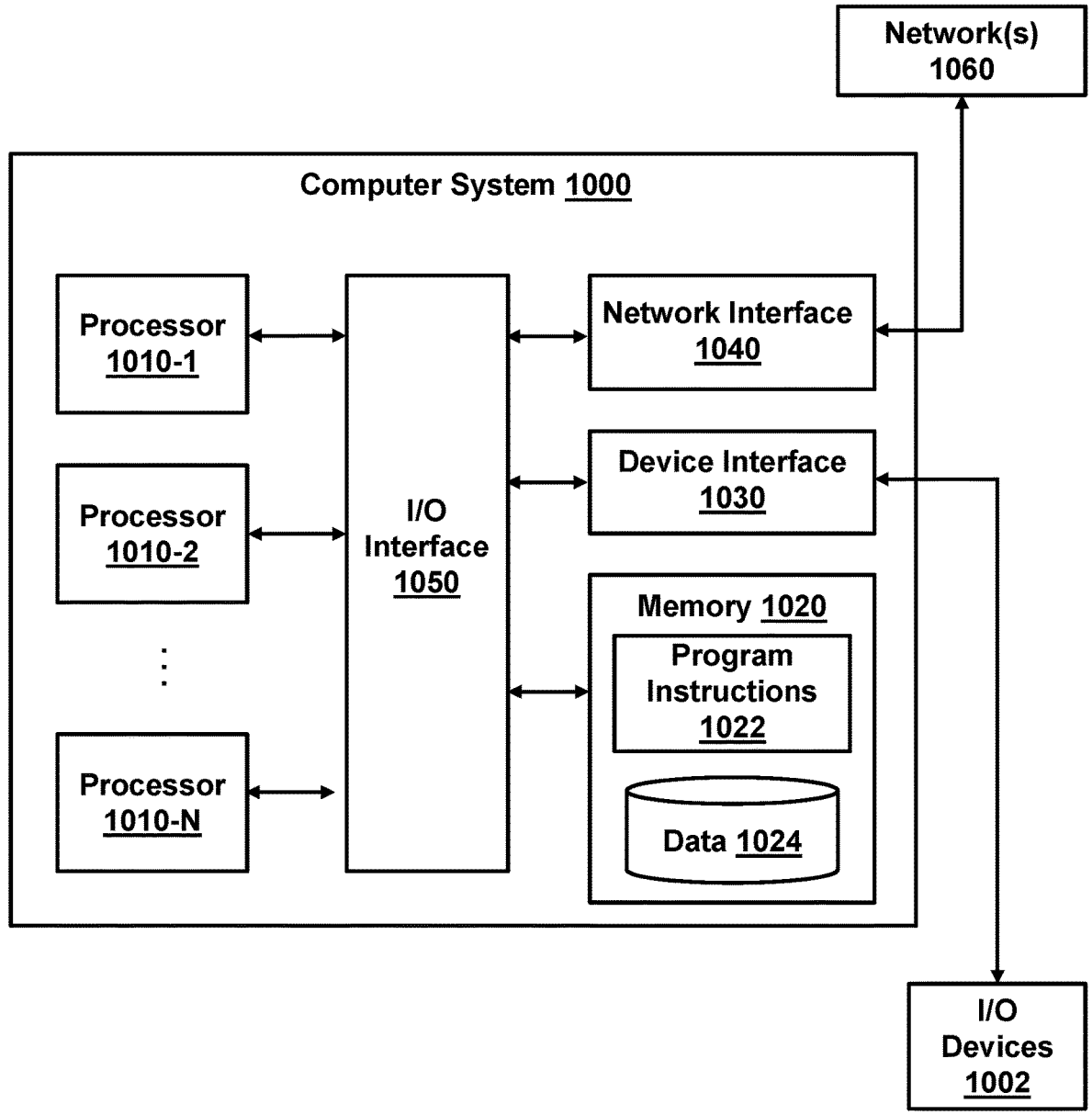
FIG. 10 illustrates an example computing system with which one or more embodiments may be implemented.

FIG. 10 is a diagram that illustrates an exemplary computing system 1000 in accordance with embodiments of the present technique. Various portions of systems and methods described herein, may include or be executed on one or more computing systems similar to computing system 1000. Further, processes and modules described herein may be executed by one or more processing systems similar to that of computing system 1000. For example, computing system 112 may execute operations using a processing system that is the same or similar to computing system 1000.

Computing system 1000 may include one or more processors (e.g., processors 1010-1-1010-N) coupled to system memory 1020, an input/output (I/O) device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010-1), or a multi-processor system including any number of suitable processors (e.g., 1010-1-1010-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computing systems) to implement various processing functions.

I/O device interface 1030 may provide an interface for connection of one or more I/O devices 1002 to computing system 1000. In some embodiments, I/O devices may include antenna assemblies, such as transmit antenna assembly 102, receive antenna assembly 104, or transmit/receive antenna assembly 202. I/O devices may include devices that receive input (e.g., from a user) or output information (e.g., to a user). I/O devices 1002 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1002 may be connected to computing system 1000 through a wired or wireless connection. I/O devices 1002 may be connected to computing system 1000 from a remote location. I/O devices 1002 located on remote computer system, for example, may be connected to computing system 1000 via a network, e.g., network(s) 1060, and network interface 1040.

Network interface 1040 may include a network adapter that provides for connection of computing system 1000 to a network. Network interface 1040 may facilitate data exchange between computing system 1000 and other devices connected to the network. Network interface 1040 may support wired or wireless communication. The network, such as for example network(s) 1060, may include an electronic communication network, such as the Internet, a local area network (LAN), a wide area network (WAN), a cellular communications network, or the like.

System memory 1020 may be configured to store program instructions 1022 or data 1024. Program instructions 1022 may be executable by a processor (e.g., one or more of processors 1010-1-1010-N) to implement one or more embodiments of the present techniques. Program instructions 1022 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010-1-1010-N) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010-1-1010-N, system memory 1020, network interface 1040, I/O devices 1002, and/or other peripheral devices. I/O interface 1050 may perform protocol, timing, or other data transformations to convert data signals from one component (e.g., system memory 1020) into a format suitable for use by another component (e.g., processors 1010-1-1010-N). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1000 or multiple computing systems 1000 configured to host different portions or instances of embodiments. Multiple computing systems 1000 may provide for parallel or sequential processing/execution of one or more portions of the techniques described herein.

Those skilled in the art will appreciate that computing system 1000 is merely illustrative and is not intended to limit the scope of the techniques described herein. Computing system 1000 may include any combination of devices or software that may perform or otherwise provide for the performance of the techniques described herein. For example, computing system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1000 may be transmitted to computing system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square," "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A radar assembly, comprising: a transmit antenna assembly with passive cooling, the transmit antenna assembly, comprising: a first active beam-steering circuit configured to control, along a first spatial dimension, a direction of an electromagnetic beam that scans a volume of an external environment to determine whether objects are located within the volume; and a first passive beam-steering circuit configured to control, along a second spatial dimension, the direction of the electromagnetic beam, wherein the first passive beam-steering circuit comprises: a first set of antenna elements configured to transmit the electromagnetic beam; and a first set of frequency scanned array cards respectively associated with the first set of antenna elements, wherein each frequency scanned array card of the first set of frequency scanned array cards is configured to cause a phase of electromagnetic radiation output by a corresponding antenna element of the first set of antenna elements to be shifted by a respective first amount such that, along the second spatial dimension, the electromagnetic beam transmitted via the first set of antenna elements is output in a direction of the volume, wherein the electromagnetic beam is formed based on a combination of the electromagnetic radiation output by each antenna element of the first set of antenna elements.

A2. The radar assembly of embodiment A1, further comprising: a receive antenna assembly with passive cooling, the receive antenna assembly comprising: a second passive beam-steering circuit configured to control, along the second spatial dimension, a direction with which to receive at least some of the electromagnetic radiation of the electromagnetic beam that reflects off an object located within the volume, comprising: a second set of antenna elements configured to receive the reflected electromagnetic radiation; and a second set of frequency scanned array cards respectively associated with the second set of antenna elements, wherein each frequency scanned array card of the second set of frequency scanned array cards is configured to cause a phase of electromagnetic radiation received by a corresponding antenna element of the second set of antenna elements to be phase-shifted by a respective second amount, the respective second amount being based on the respective first amount; and a second active beam-steering circuit configured to control, along the first spatial dimension, a direction that the second set of antenna elements scans to detect the reflected electromagnetic beam.

A3. The radar assembly of embodiment A2, wherein the first active beam-steering circuit is thermally coupled to a first heatsink such that heat from the first active beam-steering circuit is conducted to the external environment, and the second active beam-steering circuit is thermally coupled to the first heatsink such that heat produced by the second active beam-steering circuit is thermally dissipated to the external environment via the first heatsink.

A4. The radar assembly of any one of embodiments A2-A3, wherein first passive beam-steering circuit and the second passive beam-steering circuit do not include switches to control a direction of the electromagnetic beam being transmitted or a direction that the reflected electromagnetic beam is received.

A5. The radar assembly of any one of embodiments A2-A4, further comprising:
means for shielding the transmit antenna assembly and the receive antenna assembly from at least one of water or particulates.

A6. The radar assembly of any one of embodiments A2-A5, wherein: the transmit antenna assembly and the receive antenna assembly do not include active cooling; and the transmit antenna assembly and the receive antenna assembly are respectively configured to concurrently transmit and receive radar signals.

A7. The radar assembly of embodiment A6, wherein the radar assembly further comprises: means for electromagnetically isolating the transmit antenna assembly from the receive antenna assembly.

A8. The radar assembly of any one of embodiments A2-A7, wherein the transmit antenna assembly and the receive antenna assembly operate concurrently such that the first set of antenna elements transmits the electromagnetic beam during a same time period that the second set of antenna elements receives the reflected electromagnetic beam.

A9. The radar assembly of any one of embodiments A1-A8, further comprises: means for amplifying and steering the electromagnetic beam transmitted by the first set of antenna elements.

A10. The radar assembly of any one of embodiments A1-A9, wherein the respective first amount that an input signal is phase-shifted by each frequency scanned array card from the first set of frequency scanned array cards is determined based on a location, along the second spatial dimension, of the volume in space.

A11. The radar assembly of any one of embodiments A1-A10, further comprising: a computing system configured to: generate an input signal; and determine the respective first amount of phase-shift to be applied to the input signal by each antenna element of the first set of antenna elements such that the output electromagnetic beam is directed at the volume in space.

A12. The radar assembly of embodiment A11, wherein the computing system is further configured to: determine, based on a portion of the electromagnetic beam that reflects off an object located within the volume, whether the object is a target to be tracked, wherein a gain of the input signal is set based on a predefined range specified for the radar assembly.

A13. The radar assembly of any one of embodiments A1-A12, wherein the first spatial dimension is orthogonal to the second spatial dimension.

A14. The radar assembly of any one of embodiments A1-A13, wherein the first active beam-steering circuit comprises a printed circuit board having active electronics disposed thereon, wherein the printed circuit board is thermally coupled to a heatsink using one or more vias.

A15. The radar assembly of any one of embodiments A1-A14, further comprising: a receive antenna assembly, comprising: a second passive beam-steering circuit, comprising a second set of frequency scanned array cards respectively associated with the first set of antenna elements, wherein each frequency scanned array card of the second set of frequency scanned array cards is configured to cause a phase of electromagnetic radiation received by a corresponding antenna element of the first set of antenna elements to be phase-shifted by a respective second amount, the respective second amount being based on the respective first amount; and a second active beam-steering circuit configured to control, along the first spatial dimension, a direction that the first set of antenna elements scans to detect reflected electromagnetic radiation.

A16. The radar assembly of embodiment A15, wherein the second active beam-steering circuit is thermally coupled to a heatsink.

A17. The radar assembly of embodiment A16, further comprising: means for operating the transmit antenna assembly and the receive antenna assembly in parallel using the first set of antenna elements.

B1. An antenna assembly, comprising: an active beam-steering circuit configured to control, along a first spatial dimension, a direction of an electromagnetic beam that scans a volume of an external environment to determine whether objects are located within the volume, wherein the active beam-steering circuit is thermally coupled to a heatsink such that heat from the active beam-steering circuit is conducted to the external environment; a passive beam-steering circuit configured to control, along a second spatial dimension, the direction of the electromagnetic beam, wherein the passive beam-steering circuit comprises: a set of antenna elements configured to transmit the electromagnetic beam and receive a reflected electromagnetic beam resulting from the electromagnetic beam reflecting off of an object; and a set of frequency scanned array cards respectively associated with the set of antenna elements, wherein each frequency scanned array card of the set of frequency scanned array cards is configured to cause an input signal to be phase-shifted by a respective amount such that, along the second spatial dimension, the electromagnetic beam transmitted via the set of antenna elements is output in a direction of the volume, wherein: the phase-shifted input signal is used by a respective antenna element of the set of antenna elements to output a respective component of the electromagnetic beam, and the electromagnetic beam is formed based on a combination of the respective components.

B2. The antenna assembly of embodiment B1, wherein the set of frequency scanned array cards are further configured to detect the reflected electromagnetic beam having the respective phase-shift using the set of antenna elements such that the set of antenna elements transmits the electromagnetic beam and receives the reflected electromagnetic beam in parallel.

C1. A system, comprising: a two-dimensional array antenna divided into a plurality of sub-arrays disposed along a first spatial dimension, wherein each sub-array of the plurality of sub-arrays comprises: a plurality of frequency scannable elements disposed along the first spatial dimension, and a plurality of phase shifters or transmit/receive (T/R) modules disposed along a second spatial dimension, each phase shifter or T/R module connected to a plurality of frequency scannable elements disposed along the first spatial dimension, such that phase scanning is provided in the second spatial dimension; and one or more processors coupled to the two-dimensional array antenna, the one or more processors being configured to: generate a recurring radar waveform having at least a transmit portion, the transmit portion having multiple successive pulses at different frequencies to cause transmit beams to be generated by the two-dimensional array antenna at different angles in the first spatial dimension; control at least one of the plurality of the phase shifters or T/R modules along the second spatial dimension to cause the transmit beams to be generated by the two-dimensional array antenna at different angles in the second spatial dimension; and process return signals received by the plurality of sub-arrays to estimate a target location in the first spatial dimension and the second spatial dimension, wherein the return signals are associated with the recurring radar waveform.

C2. The system of embodiment C1, wherein each sub-array of the plurality of sub-arrays is coupled to a respective analog-to-digital converter (ADC), and each ADC is coupled to the one or more processors.

C3. The system of embodiment C2, wherein the respective ADC coupled to each sub-array of the plurality of sub-arrays is an only ADC coupled to that respective sub-array.

C4. The system of embodiment C1, wherein: the first spatial dimension corresponds to columns of the two-dimensional array antenna; and the second spatial dimension corresponds to rows of the two-dimensional array antenna.

C5. The system of embodiment C4, wherein the first spatial dimension is orthogonal to the second spatial dimension.

C6. The system of embodiment C1, wherein the return signals being processed comprises the one or more processors being configured to: perform steps for using interferometric techniques to estimate the target location.

C7. The system of embodiment C1, wherein the return signals being processed comprises the one or more processors being configured to: perform steps for using maximum likelihood estimation techniques to estimate the target location.

C8. The system of embodiment C1, wherein the plurality of frequency scannable elements comprises a planar card with a series of end-fire antenna elements connected to a common transmission line via couplers, the planar card containing no powered integrated circuitry.

C9. The system of embodiment C1, wherein: the two-dimensional array antenna is exclusively passively cooled; the plurality of frequency scannable elements comprises between eight and sixty-four antenna elements; the two-dimensional array antenna is between 5,000 and 40,000 cubic centimeters in volume; the different frequencies of the transmit beams comprise frequencies in the Ku frequency band; and the one or more processors comprise at least one of a field programmable gate array (FPGA), a graphics processing unit (GPU), or a centralized processing unit (CPU).

C10. The system of embodiment C1, wherein each sub-array of the plurality of sub-arrays comprises at least two planar cards, wherein each planar card comprises a plurality of antenna elements.

C11. The system of embodiment C1, further comprising: a heatsink thermally coupled to the two-dimensional array antenna, the heatsink being configured to dissipate heat to an external environment.

C12. The system of embodiment C11, wherein the heatsink is passively cooled.

C13. The system of embodiment C1, further comprising: means for shielding the two-dimensional array antenna from at least one of water or particulates.

C14. The system of embodiment C1, wherein: the two-dimensional array antenna does not include active cooling; and the two-dimensional array antenna is configured to concurrently output the transmit beams and receive the return signals.

C15. The system of embodiment C1, wherein the plurality of sub-arrays comprises: a plurality of receiver antenna sub-arrays configured to receive the return signals; and a plurality of transmitter antenna sub-arrays configured to output the transmit beams.

C16. The system of embodiment C15, further comprising: means for electromagnetically isolating the plurality of receiver antenna sub-arrays from the plurality of transmitter antenna sub-arrays.

D1. A method, implemented by one or more processors configured to execute computer program instructions to effectuate the method, the method comprising: operating a radar comprising a two-dimensional array antenna comprising a plurality of sub-arrays disposed along a first spatial dimension, wherein each sub-array of the plurality of sub-arrays comprises a plurality of frequency scannable elements disposed along the first spatial dimension and a plurality of phase shifters or transmit/receive (T/R) modules disposed along a second spatial dimension, each phase shifter or T/R module connected to a plurality of frequency scannable elements disposed along the first spatial dimension, such that phase scanning is provided in the second spatial dimension, such that target location in the first spatial dimension and the second spatial dimension is estimated based on signals received by the plurality of sub-arrays.

D2. The method of embodiment D1, further comprising: generating a recurring radar waveform having at least a transmit portion, wherein the transmit portion has multiple successive pulses at different frequencies to cause transmit beams to be generated by the two-dimensional array antenna at different angles in the first spatial dimension; controlling at least one of the plurality of phase shifters or T/R modules along the second spatial dimension to cause the transmit beams to be generated by the two-dimensional array antenna at different angles in the second spatial dimension; and processing return signals received by the plurality of sub-arrays to estimate a target location in the first spatial dimension and the second spatial dimension, wherein the return signals are associated with the recurring radar waveform.

E1. A system, comprising: a two-dimensional array antenna divided into a plurality of sub-arrays disposed along a first spatial dimension, wherein each sub-array of the plurality of sub-arrays comprises: a plurality of frequency scannable elements disposed along the first spatial dimension, and a plurality of phase shifters or transmit/receive (T/R) modules disposed along a second spatial dimension, each phase shifter or T/R module connected to a plurality of frequency scannable elements disposed along the first spatial dimension, such that phase scanning is provided in the second spatial dimension; and one or more processors coupled to the two-dimensional array antenna, the one or more processors being configured to generate output signals to be transmitted to the two-dimensional array antenna and process return signals received by the two-dimensional array antenna.

E2. The system of embodiment E1, wherein the one or more processors are configured to: generate a recurring radar waveform having at least a transmit portion and a receive portion, the transmit portion having multiple successive pulses at different frequencies to cause transmit beams to be generated by the two-dimensional array antenna at different angles in the first spatial dimension; control at least one of the plurality of phase shifters or T/R modules along the second spatial dimension to cause the transmit beams to be generated by the two-dimensional array antenna at different angles in the second spatial dimension; and process return signals received by the plurality of sub-arrays to estimate a target location in the first spatial dimension and the second spatial dimension, wherein the return signals are associated with the recurring radar waveform.

What is claimed is:

1. A radar assembly comprising:
a transmit antenna array comprising a plurality of transmit antenna sub-arrays arranged in a first direction, wherein:
the plurality of transmit antenna sub-arrays are configured to be controlled by a first active beam steering circuit to transmit an electromagnetic beam to scan, in the first direction, at least part of a volume of space,
each of at least some of the transmit antenna sub-arrays comprise a set of transmit antennas, and
the transmit antennas are configured to be controlled by a first passive beam steering circuit to transmit the electromagnetic beam to scan, in a second direction, the volume of space; and a receive antenna array comprising a plurality of receive antenna sub-arrays arranged in a third direction, wherein:
the plurality of receive antennas sub-arrays are configured to be controlled by a second active beam steering circuit to scan, in the third direction, at least part of a second volume of space to receive reflected electromagnetic radiation of the transmitted electromagnetic beam,
each of at least some of the receive antenna sub-arrays comprise a set of receive antennas, and
the receive antennas are configured to be controlled by a second passive beam steering circuit to scan, in a fourth direction, the second volume of space to receive the reflected electromagnetic radiation of the transmitted electromagnetic beam.

2. The radar assembly of claim 1, wherein:
the transmit antenna array is configured to be passively cooled;
the receive antenna array is configured to be passively cooled;
the first passive beam steering circuit further comprises a frequency-scanned array card configured to provide phase-controlled electromagnetic radiation to the transmit antennas; or
the second passive beam steering circuit further comprises a frequency-scanned array card configured to phase-shift received electromagnetic radiation from the receive antennas.

3. The radar assembly of claim 1, wherein the first active beam steering circuit comprises a plurality of phase shifters configured to provide phase-controlled electromagnetic radiation to the plurality of transmit antenna sub-arrays, and wherein the second active beam steering circuit comprises a plurality of phase shifters configured to phase-shift the received electromagnetic radiation from the receive antenna sub-arrays.

4. The radar assembly of claim 1, wherein:
the transmit antenna array is the receive antenna array;
the transmit antenna sub-arrays are the receive antenna sub-arrays;
the first active beam steering circuit is the second active beam steering circuit;
the first passive beam steering circuit is the second passive beam steering circuit;
the transmit antennas are the receive antennas;
the volume of space is the second volume of space;
the first direction is the third direction;
the second direction is the fourth direction; and
the first direction is orthogonal to the second direction.

5. The radar assembly of claim 4, wherein each transmit antenna sub-array further comprises a transmit/receive (T/R) selector configured to select a transmit mode or receive mode for the transmit antenna sub-array.

6. The radar assembly of claim 5, wherein the T/R selector further comprises a plurality of phase shifters configured to provide phase-controlled electromagnetic radiation to the plurality of transmit antenna sub-arrays.

7. The radar assembly of claim 1, further comprising:
a heat sink thermally coupled to at least of portion of the first active beam steering circuit, the second active beam steering circuit, or both, the heat sink being configured to dissipate heat to an external environment;
a radome, the radome being configured to protect at least a portion of the transmit antenna array, the receive antenna array, or both from at least one of water or particulates;

means for electromagnetically isolating the transmit antenna array from the receive antenna array;
means for amplifying input to the transmit antennas; and
means for amplifying output from the receive antennas.

8. The radar assembly of claim 1, wherein the transmit antenna array and the receive antenna array are configured to operate concurrently.

9. The radar assembly of claim 1, wherein the transmit antenna array and the receive antenna array are configured to operate substantially simultaneously.

10. The radar assembly of claim 1, wherein the transmit antenna array and the receive antenna array are configured to operate sequentially.

11. The radar assembly of claim 1, wherein:
the transmit antenna array has no active cooling;
the transmit antenna array has no switches to control the scanning to transmit the electromagnetic beam; and
the receive antenna array has no switches to control the scanning to receive the reflected electromagnetic radiation.

12. The radar assembly of claim 1, wherein:
each and every of the transmit antenna sub-arrays comprise a set of transmit antennas; and
each and every of the receive antenna sub-arrays comprise a set of receive antennas.

13. The radar assembly of claim 1, further comprising:
the first active beam steering circuit;
the first passive beam steering circuit;
the second active beam steering circuit; and the second passive beam steering circuit.

14. The radar assembly of claim 1, further comprising a computing system, the computing system being configured to determine, based on the received reflected radiation, a location of an object in the volume of space.

15. The radar assembly of claim 14, wherein the computer system is further configured to generate an input signal to the transmit antenna array, and wherein the input signal is configured to cause the first active beam steering circuit to scan the volume of space in the first direction.

16. The radar assembly of claim 15, the input signal further comprising a phase shift, wherein the phase shift is configured to cause the first passive steering circuit to scan the volume of space in the second direction.

17. The radar assembly of claim 14, wherein the computer system is further configured to determine a speed or direction of the object in the volume of space.

18. The radar assembly of claim 14, wherein the computer system further configured to track the object in the volume of space.

19. The radar assembly of claim 1, wherein the radar assembly is substantially portable.

20. The radar assembly of claim 19, wherein the radar assembly is 16" by 22" by 6.5" or smaller in size.

21. The radar assembly of claim 19, wherein the radar assembly is operable during transport.

22. A method, comprising:
transmitting, by a plurality of transmit antenna sub-arrays, an electromagnetic beam into a volume of space, the electromagnetic beam scanned in a first direction in the volume of space by a first active beam steering circuit;
transmitting, by a set of transmit antennas of the plurality of transmit antenna sub-arrays, the electromagnetic beam into the volume of space, the electromagnetic beam scanned in a second direction in the volume of space by a first passive beam steering circuit;
receiving, by a plurality of receive antenna sub-arrays, reflected electromagnetic radiation from the electromagnetic beam from the volume of space, the plurality of receive antenna sub-arrays configured to scan in a third direction in the volume of space by a second active beam steering circuit; and receiving, by a set of receive antennas of the plurality of receive antenna sub-arrays, the reflected electromagnetic radiation from the electromagnetic beam from the volume of space, the set of receive antennas configured to scan in a fourth direction in the volume of space by a second passive beam steering circuit.

23. The method of claim 22, further comprising:

processing, by a computer system, the received reflected electromagnetic radiation to estimate a target location in at least one of the first direction and the second direction.

24. The method of claim of claim 23, further comprising:

determining, by the computer system, a speed or direction of the target in at least one of the first direction and the second direction.

* * * * *